United States Patent
Fread et al.

(10) Patent No.: US 11,281,198 B2
(45) Date of Patent: Mar. 22, 2022

(54) CENTRAL PLANT OPTIMIZATION WITH OPTIMIZATION MODIFICATION

(71) Applicant: Johnson Controls Tyco IP Holdings LLP, Milwaukee, WI (US)

(72) Inventors: Jared W. Fread, Milwaukee, WI (US); Graeme Willmott, Milwaukee, WI (US); Ryan C. Beaty, Milwaukee, WI (US); Shawn A. Schlagenhaft, Fond du Lac, WI (US); Matthew J. Ellis, Milwaukee, WI (US); Michael J. Wenzel, Grafton, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 74 days.

(21) Appl. No.: 16/428,548

(22) Filed: May 31, 2019

(65) Prior Publication Data
US 2020/0379447 A1 Dec. 3, 2020

(51) Int. Cl.
G05B 19/418 (2006.01)

(52) U.S. Cl.
CPC ............ G05B 19/4188 (2013.01); *G05B 2219/31001* (2013.01); *G05B 2219/32291* (2013.01)

(58) Field of Classification Search
None
See application file for complete search history.

(56) References Cited

U.S. PATENT DOCUMENTS

| | | | | |
|---|---|---|---|---|
| 3,829,786 | A * | 8/1974 | Hoffman | H02P 23/08 327/309 |
| 4,924,386 | A * | 5/1990 | Freedman | G06Q 10/06375 705/7.37 |
| 10,101,731 | B2 | 10/2018 | Asmus et al. | |
| 2004/0006502 | A1* | 1/2004 | Masiello | H02J 3/004 703/2 |
| 2004/0059696 | A1* | 3/2004 | Kropaczek | G06F 30/00 706/46 |
| 2013/0006429 | A1* | 1/2013 | Shanmugam | F02C 9/42 700/286 |
| 2015/0057824 | A1* | 2/2015 | Gheerardyn | G06Q 50/06 700/296 |
| 2015/0316903 | A1* | 11/2015 | Asmus | G05B 15/02 700/291 |

(Continued)

*Primary Examiner* — Mohammad Ali
*Assistant Examiner* — David Earl Ogg
(74) *Attorney, Agent, or Firm* — Foley & Lardner LLP

(57) ABSTRACT

A control system for a central plant having subplants including devices operating to serve energy loads of a building. The system includes a high level optimization module that performs high level optimization of thermal loads subject to constraints to generate subplant load allocations. The control system includes a low level optimization module that performs low level optimization of the subplant load allocations to determine operating states for the devices. The control system includes a constraint modifier that modifies the constraints for the high level optimization module based on equipment schedules. The control system also includes a binary optimization modifier including a pruner module that receives the minimum off schedule to determine adjusted branches and a seeder module that receives the minimum on schedule to determine a starting node for use in binary optimization performed by the low optimization module.

20 Claims, 14 Drawing Sheets

(56) References Cited

U.S. PATENT DOCUMENTS

| | | |
|---|---|---|
| 2015/0316907 A1 | 11/2015 | Elbsat et al. |
| 2016/0223214 A1* | 8/2016 | Turner .................. G05B 15/02 |
| 2017/0104345 A1 | 4/2017 | Wenzel et al. |
| 2017/0219233 A1* | 8/2017 | Ye .......................... G05B 15/02 |

* cited by examiner

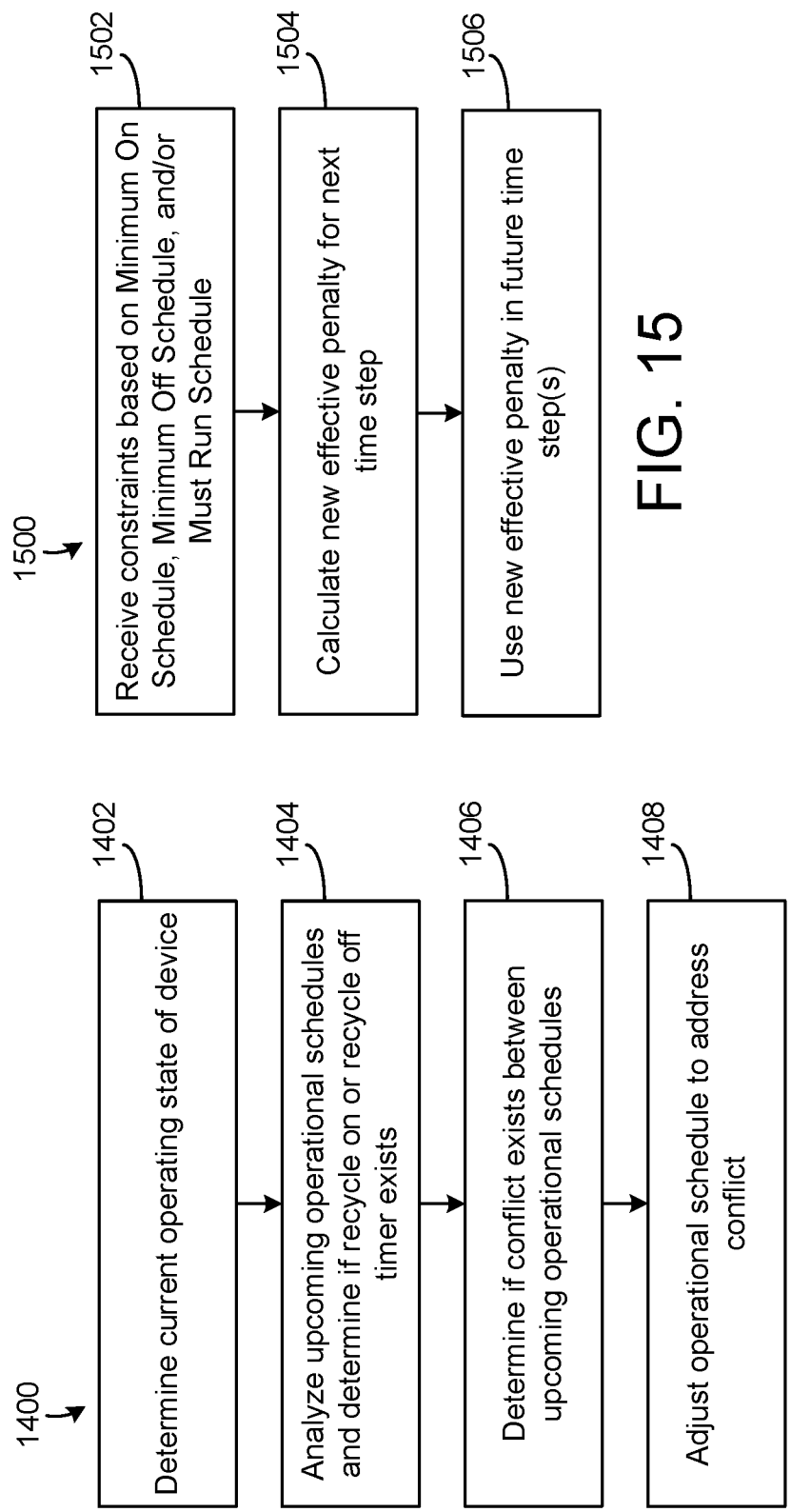

CENTRAL PLANT OPTIMIZATION WITH OPTIMIZATION MODIFICATION

BACKGROUND

The present disclosure relates generally to the operation of a central plant for serving building thermal energy loads. The present disclosure relates more particularly to systems and methods for optimizing the operation of one or more subplants of a central plant.

A central plant may include various types of equipment configured to serve the thermal energy loads of a building or building campus (i.e., a system of buildings). For example, a central plant may include heaters, chillers, heat recovery chillers, cooling towers, or other types of equipment configured to provide heating or cooling for the building. Some central plants include thermal energy storage configured to store the thermal energy produced by the central plant for later use.

SUMMARY

One implementation of the present disclosure is a control system for a central plant having subplants including devices that operate to serve energy loads of a building. The control system includes a high level optimization module configured to perform a high level optimization of thermal loads subject to constraints to generate subplant load allocations in an optimization period. The control system also includes a low level optimization module configured to perform a low level optimization of the subplant load allocations to determine, in the optimization period, operating states for devices included in the subplants included in the central plant. The control system also includes a constraint modifier configured to modify the constraints for use by the high level optimization module based on minimum off schedules, generate minimum on schedules associated with the subplants based on user inputs. The control system also includes a binary optimization modifier configured to generate simplified solutions for use by the low level optimization module. The binary optimization modifier includes a pruning module configured to receive the minimum off schedules to determine adjusted branches for use in a binary optimization process by the low level optimization module and a seeding module configured to receive the minimum on schedules to determine a starting node for use in the binary optimization process by the low level optimization module.

In some embodiments, the constraint modifier is configured to modify the constraints based on must run schedules associated with the devices based on the user inputs.

In some embodiments, the low level optimization module is configured to perform the binary optimization process to select devices to operate for the time steps in the optimization period.

In some embodiments, the constraint modifier is configured to generate a decayed penalty value for the constraints.

In some embodiments, the pruning module is configured to generate a modified upper bound constraint based on the minimum off schedules. The modified upper bound constraint is used by the high level optimization module in a high level optimization process.

In some embodiments, the seeding module is configured to raise a value of a lower bound constraint to a minimum turndown value for a particular device based on one of the minimum on schedules associated with the particular device.

In some embodiments, the binary optimization modifier includes a hysteresis modifier configured to receive an identification of a combination of dispatched devices for a previous time step from the low level optimization module. The hysteresis modifier is configured to calculate an adjusted heat transfer rate value for the combination of dispatched devices for the previous time step.

In some embodiments, the low level optimization module is configured to receive the adjusted heat transfer rate value from the hysteresis modifier and calculate an energy consumption value associated using the adjusted heat transfer rate value.

Another implementation of the present disclosure is a method of controlling a central plant having subplants including devices operating to serve energy loads of a building. The method involves receiving minimum off schedules and minimum on schedules associated with the devices based on user input, using the minimum off schedules to determine modified upper bound constraints and the minimum on schedules to determine modified lower bound constraints. The adjusted constraints include the modified upper bound constraints and the modified lower bound constraints. The method also involves performing a high level optimization of the subplants subject to the adjusted constraints to subplant load allocations, using the minimum off schedules to determine branches for use in a binary optimization process, using the minimum on schedules to determine a starting node for use in the binary optimization process, performing the binary optimization process using the adjusted branches and the starting node to determine operating states associated with the devices included in the subplants, and using the operating states and the subplant load allocations to determine control actions for the devices included in the subplants.

In some embodiments, performing the binary optimization process involves performing a branch and bound process.

In some embodiments, the method involves receiving an identification of a combination of dispatched devices for a previous time step and calculating an adjusted heat transfer rate value for the combination of dispatched devices for the previous time step.

In some embodiments, the method involves using the adjusted heat transfer rate value to calculate an energy consumption value associated using the adjusted heat transfer rate value.

In some embodiments, using the minimum on schedules to determine the modified lower bound constraints further involves increasing the value of the lower bound constraints to at least a minimum turndown value for the devices associated with the minimum on schedule.

In some embodiments, the method involves generating a decayed penalty value for the adjusted constraints.

Yet another implementation of the present disclosure is a control system for a central plant having subplants including devices that operate to energy loads of a building. The control system includes a high level optimization module configured to perform a high level optimization of thermal loads subject to constraints to generate subplant load allocations in an optimization period, a low level optimization module configured to perform a low level optimization of the subplant load allocations to determine in the optimization horizon operating states devices included in the subplants included in the central plant, a constraint modifier configured to modify the constraints for use by the high level optimization module based on the minimum off schedules and the minimum on schedules associated with each device, and a binary optimization modifier configured to generate simplified solutions for use by the low level optimization module. The binary optimization modifier includes a hysteresis modifier configured to receive an identification of a combination of dispatched devices for a previous time step from the low level optimization module and calculate an adjusted heat transfer rate value for the combination of dispatched devices for the previous time step.

In some embodiments, the low level optimization module is configured to receive the adjusted heat transfer rate value from the hysteresis modifier and calculate an energy consumption value associated using the adjusted heat transfer rate value.

In some embodiments, the constraint modifier further includes a pruning module configured to receive the minimum off schedules and determine, using the minimum off schedules, adjusted branches for use in a binary optimization process by the low level optimization module.

In some embodiments, the constraint modifier is configured to generate a modified upper bound constraint based on the minimum off schedules. The modified upper bound constraint is used by the high level optimization module in a high level optimization process.

In some embodiments, the binary optimization modifier further includes a seeding module configured to receive the minimum on schedules to determine a starting node for use in a binary optimization process by the low level optimization module.

In some embodiments, the constraint modifier is configured to raise the value of a lower bound constraint to a minimum turndown value for a particular device based on the minimum on schedule associated with the particular device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 14 is a flowchart illustrating a process of determining conflicting constraints, according to some embodiments.

FIG. 15 is a flowchart illustrating a process of determining decaying penalties applied to constraints, according to some embodiments.

DETAILED DESCRIPTION

Figure 1:
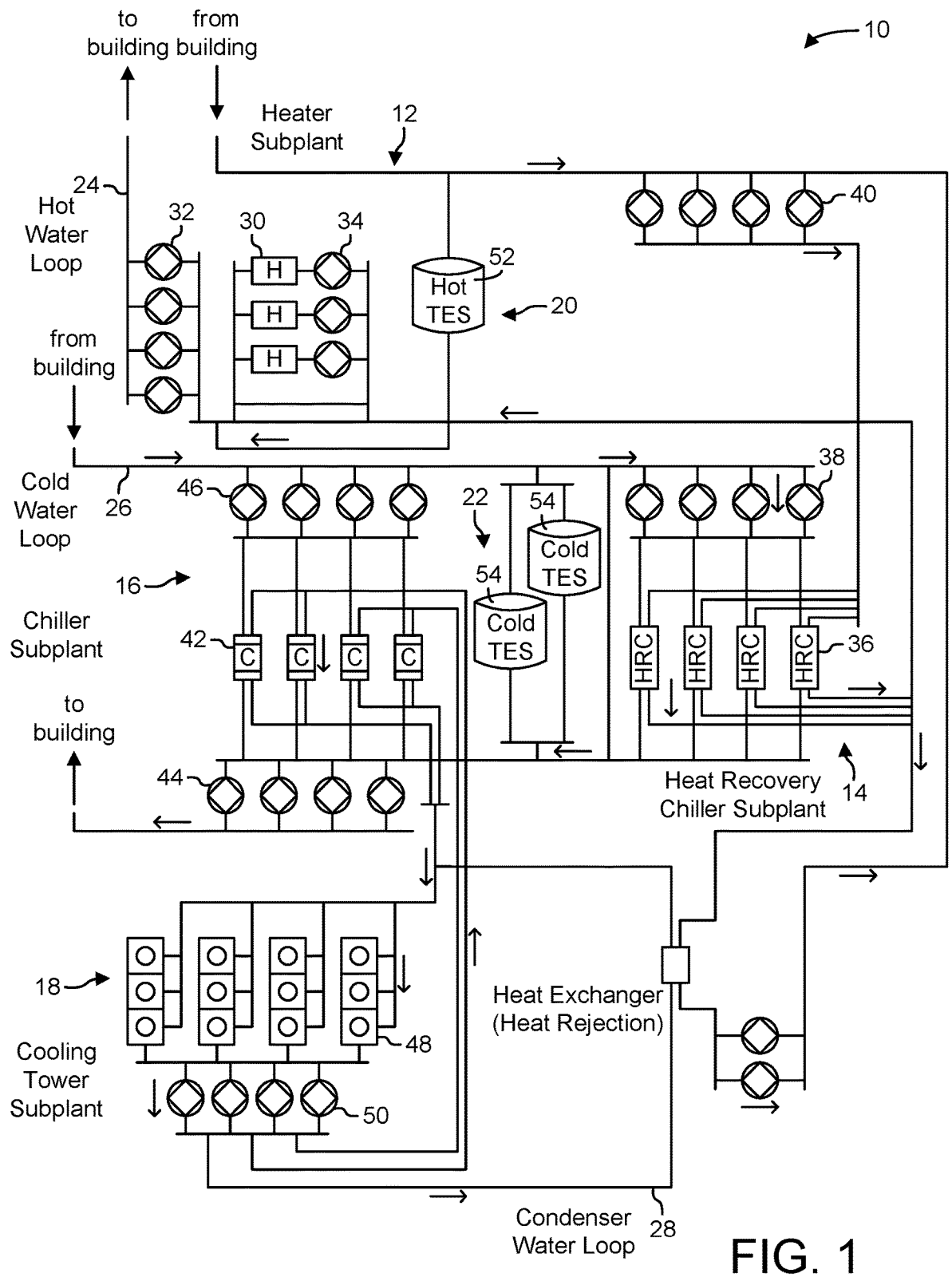
FIG. 1 is a diagram of a central plant including a plurality of subplants operable to serve the thermal energy loads of a building or building system, according to an exemplary embodiment.

Referring generally to the FIGURES, systems and methods for low level central plant optimization and are shown, according to various exemplary embodiments. The systems and methods described herein may be used to control the equipment of a central plant that provides heating and/or cooling for a building or building campus (i.e., a system of buildings). A central plant may include a plurality of subplants, each configured to perform a particular function. For example, a central plant may include a heater subplant, a chiller subplant, a heat recovery chiller subplant, a hot thermal energy storage subplant, a cold thermal energy storage subplant, etc.

According to an exemplary embodiment, each subplant receives a setpoint thermal energy load to be served by the subplant (e.g., a thermal energy per unit time) and generates equipment dispatch states and/or operational setpoints for various devices of the subplant to serve the setpoint thermal energy load. For example, each subplant may include a plurality of individual devices (e.g., heaters, chillers, pumps, valves, etc.) configured to facilitate the functions of the subplant. The equipment dispatch states may control which of the devices of the subplant are utilized to serve the thermal energy load (e.g., on/off states). The operational setpoints may determine individual setpoints for each active device of the subplant that is capable of operating at a variable capacity (e.g., operating a chiller at 10% capacity, 60% capacity, etc.).

The low level central plant optimization described herein may be used in conjunction with a high level central plant optimization. The high level optimization may determine an optimal distribution of thermal energy loads across multiple subplants of a central plant over a time horizon in order to minimize the cost of operating the central plant. For example, the high level optimization may determine an optimal subplant load $\dot{Q}_{subplant}$ for each subplant and provide the optimal subplant loads as setpoints to the various subplants. The low level optimization may be performed for each subplant. The low level optimization may determine which devices of the subplant to utilize (e.g., on/off states) and/or operating setpoints (e.g., temperature setpoints, flow setpoints, etc.) for individual devices of the subplant in order to minimize the amount of energy consumed by the subplant to serve the subplant load $\dot{Q}_{subplant}$.

In some embodiments, the low level optimization is performed for several different combinations of load and weather conditions to produce multiple data points (i.e., minimum energy consumption values for various subplant loads). A subplant curve can be fit to the low level optimization data for each subplant to determine the rate of utility usage (e.g., power consumption, resource consumption, etc.) as a function of the load served by the subplant. The high level optimization may use the subplant curves for a plurality of subplants to determine the optimal distribution of thermal energy loads across the subplants.

The low level optimization may use thermal models of the subplant equipment and/or the subplant network to determine the minimum energy consumption for a given thermal energy load. Equipment curves for individual devices or a combination of devices (e.g., thermal load v. resource consumption) may be used to determine an optimal selection of devices for a given load condition. For example, operating two chillers at 50% capacity may consume less energy than operating a single chiller at 100% capacity while producing the same thermal energy load. The equipment curves may determine optimal switching points for turning off or on individual devices. The thermal network may be used to establish the feasibility of a selection of equipment and may ensure that the required thermal energy load can be met. For example, the working capacity of one device may depend on the operating setpoints of other upstream, downstream, or component devices. The low level optimization may consider current operating conditions (e.g., weather conditions, environmental conditions, etc.) in determining the optimal selection of equipment and/or setpoints to serve a given thermal energy load.

In some embodiments, the low level optimization uses mixed binary optimization (e.g., branch and bound) and/or nonlinear optimization (e.g., sequential quadratic programming) to minimize the energy consumption of a subplant. Binary optimization and the nonlinear optimization may both contribute to minimization of energy consumption. Binary optimization may be used to determine the optimal combination of equipment for meeting the subplant load $\dot{Q}_{subplant}$. Nonlinear optimization may be used to determine optimal operating setpoints (e.g., setpoints expected to result in minimum or near-minimum power consumption for a determined combination of equipment). A system or method of the present invention having mixed binary optimization and/or nonlinear optimization may advantageously result in lower central plant operating costs. In some embodiments, the mixed optimization may be advantageously suited for improving real time (i.e., near real time) optimization and automation of the central plant. The mixed optimization may also be implemented in a planning tool to predict the performance of the central plant for a future time period.

Referring now to FIG. 1, a diagram of a central plant 10 is shown, according to an exemplary embodiment. Central plant 10 is shown to include a plurality of subplants including a heater subplant 12, a heat recovery chiller subplant 14, a chiller subplant 16, a cooling tower subplant 18, a hot thermal energy storage (TES) subplant 20, and a cold thermal energy storage (TES) subplant 22. Subplants 12-22 consume resources (e.g., water, natural gas, electricity, etc.) from utilities to serve the thermal energy loads (e.g., hot water, cold water, heating, cooling, etc.) of a building or campus. For example, heater subplant 12 may be configured to heat water in a hot water loop 24 that circulates the hot water between central plant 10 and a building (not shown). Chiller subplant 16 may be configured to chill water in a cold water loop 26 that circulates the cold water between central plant 10 and the building. Heat recovery chiller subplant 14 may be configured to transfer heat from cold water loop 26 to hot water loop 24 to provide additional heating for the hot water and additional cooling for the cold water. Condenser water loop 28 may absorb heat from the cold water in chiller subplant 16 and reject the absorbed heat in cooling tower subplant 18 or transfer the absorbed heat to hot water loop 24. Hot TES subplant 20 and cold TES subplant 22 store hot and cold thermal energy, respectively, for subsequent use.

Hot water loop 24 and cold water loop 26 may deliver the heated and/or chilled water to air handlers located on the rooftop of a building or to individual floors or zones of the building. The air handlers push air past heat exchangers (e.g., heating coils or cooling coils) through which the water flows to provide heating or cooling for the air. The heated or cooled air may be delivered to individual zones of the building to serve the thermal energy loads of the building. The water then returns to central plant 10 to receive further heating or cooling in subplants 12-22.

Although central plant 10 is shown and described as heating and cooling water for circulation to a building, it is understood that any other type of working fluid (e.g., glycol, CO2, etc.) may be used in place of or in addition to water to serve the thermal energy loads. In other embodiments, central plant 10 may provide heating and/or cooling directly to the building or campus without requiring an intermediate heat transfer fluid. Central plant 10 may be physically separate from a building served by subplants 12-22 or physically integrated with the building (e.g., located within the building).

Each of subplants 12-22 may include a variety of equipment configured to facilitate the functions of the subplant. For example, heater subplant 12 is shown to include a plurality of heating elements 30 (e.g., boilers, electric heaters, etc.) configured to add heat to the hot water in hot water loop 24. Heater subplant 12 is also shown to include several pumps 32 and 34 configured to circulate the hot water in hot water loop 24 and to control the flow rate of the hot water through individual heating elements 30. Heat recovery chiller subplant 14 is shown to include a plurality of heat recovery heat exchangers 36 (e.g., refrigeration circuits) configured to transfer heat from cold water loop 26 to hot water loop 24. Heat recovery chiller subplant 14 is also shown to include several pumps 38 and 40 configured to circulate the hot water and/or cold water through heat recovery heat exchangers 36 and to control the flow rate of the water through individual heat recovery heat exchangers 36.

Chiller subplant 16 is shown to include a plurality of chillers 42 configured to remove heat from the cold water in cold water loop 26. Chiller subplant 16 is also shown to include several pumps 44 and 46 configured to circulate the cold water in cold water loop 26 and to control the flow rate of the cold water through individual chillers 42. Cooling tower subplant 18 is shown to include a plurality of cooling towers 48 configured to remove heat from the condenser water in condenser water loop 28. Cooling tower subplant 18 is also shown to include several pumps 50 configured to circulate the condenser water in condenser water loop 28 and to control the flow rate of the condenser water through individual cooling towers 48.

Hot TES subplant 20 is shown to include a hot TES tank 52 configured to store the hot water for later use. Hot TES subplant 20 may also include one or more pumps or valves configured to control the flow rate of the hot water into or out of hot TES tank 52. Cold TES subplant 22 is shown to include cold TES tanks 54 configured to store the cold water for later use. Cold TES subplant 22 may also include one or more pumps or valves configured to control the flow rate of the cold water into or out of cold TES tanks 54. In some embodiments, one or more of the pumps in central plant 10 (e.g., pumps 32, 34, 38, 40, 44, 46, and/or 50) or pipelines in central plant 10 includes an isolation valve associated therewith. In various embodiments, isolation valves may be integrated with the pumps or positioned upstream or downstream of the pumps to control the fluid flows in central plant 10. In other embodiments, more, fewer, or different types of devices may be included in central plant 10.

Figure 2:
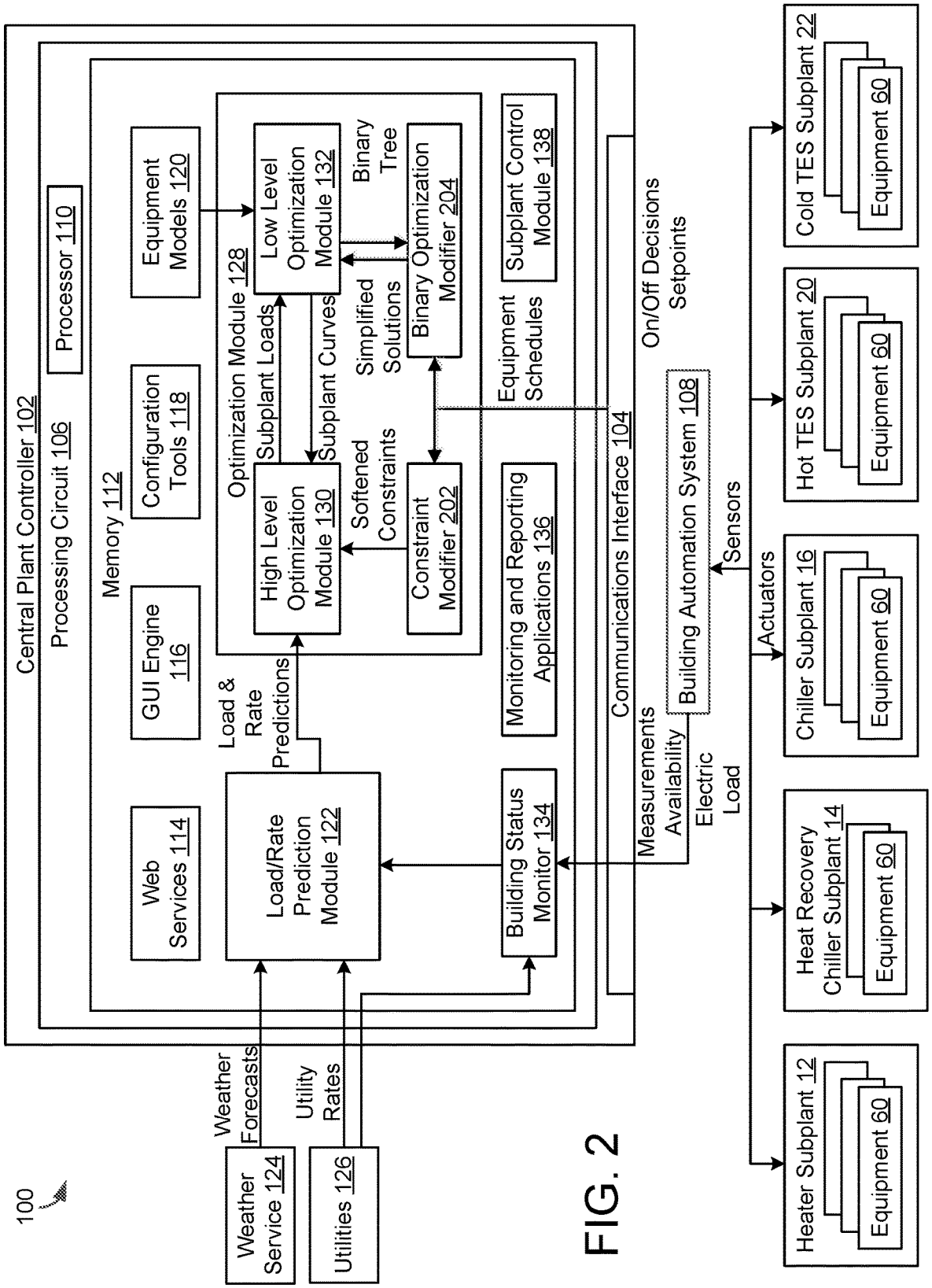
FIG. 2 is a block diagram of a central plant system including a central plant controller configured to generate on/off decisions and operating setpoints for equipment the central plant of FIG. 1, according to an exemplary embodiment.

Referring now to FIG. 2, a block diagram illustrating a central plant system 100 is shown, according to an exemplary embodiment. System 100 is shown to include a central plant controller 102, a building automation system 108, and a plurality of subplants 12-22. Subplants 12-22 may be the same as previously described with reference to FIG. 1. For example, subplants 12-22 are shown to include a heater subplant 12, a heat recovery chiller subplant 14, a chiller subplant 16, a hot TES subplant 20, and a cold TES subplant 22.

Each of subplants 12-22 is shown to include equipment 60 that can be controlled by central plant controller 102 and/or building automation system 108 to optimize the performance of central plant 10. Equipment 60 may include, for example, heating devices 30, chillers 42, heat recovery heat exchangers 36, cooling towers 48, thermal energy storage devices 52-54, pumps 32, 34, 38, 44, 46, 50, valves, and/or other devices of subplants 12-22. Individual devices of equipment 60 can be turned on or off to adjust the thermal energy load served by each of subplants 12-22. In some embodiments, individual devices of equipment 60 can be operated at variable capacities (e.g., operating a chiller at 10% capacity or 60% capacity) according to an operating setpoint received from central plant controller 102.

In some embodiments, one or more of subplants 12-22 includes a subplant level controller configured to control the equipment 60 of the corresponding subplant. For example, central plant controller 102 may determine an on/off configuration and global operating setpoints for equipment 60. In response to the on/off configuration and received global operating setpoints, the subplant controllers may turn individual devices of equipment 60 on or off, and implement specific operating setpoints (e.g., damper position, vane position, fan speed, pump speed, etc.) to reach or maintain the global operating setpoints.

Building automation system (BAS) 108 may be configured to monitor conditions within a controlled building. For example, BAS 108 may receive input from various sensors (e.g., temperature sensors, humidity sensors, airflow sensors, voltage sensors, etc.) distributed throughout the building and may report building conditions to central plant controller 102. Building conditions may include, for example, a temperature of the building or a zone of the building, a power consumption (e.g., electric load) of the building, a state of one or more actuators configured to affect a controlled state within the building, or other types of information relating to the controlled building. BAS 108 may operate subplants 12-22 to affect the monitored conditions within the building and to serve the thermal energy loads of the building.

BAS 108 may receive control signals from central plant controller 102 specifying on/off states and/or setpoints for equipment 60. BAS 108 may control equipment 60 (e.g., via actuators, power relays, etc.) in accordance with the control signals provided by central plant controller 102. For example, BAS 108 may operate equipment 60 using closed loop control to achieve the setpoints specified by central plant controller 102. In various embodiments, BAS 108 may be combined with central plant controller 102 or may be part of a separate building management system. According to an exemplary embodiment, BAS 108 is a METASYS® brand building management system, as sold by Johnson Controls, Inc.

Central plant controller 102 may monitor the status of the controlled building using information received from BAS 108. Central plant controller 102 may be configured to predict the thermal energy loads (e.g., heating loads, cooling loads, etc.) of the building for plurality of time steps in a prediction window (e.g., using weather forecasts from a weather service). Central plant controller 102 may generate on/off decisions and/or setpoints for equipment 60 to minimize the cost of energy consumed by subplants 12-22 to serve the predicted heating and/or cooling loads for the duration of the prediction window. Central plant controller 102 may be configured to carry out process 500 (FIG. 5), process 600 (FIG. 6), process 700 (FIG. 7), and other processes described herein. According to an exemplary embodiment, central plant controller 102 is integrated within a single computer (e.g., one server, one housing, etc.). In various other exemplary embodiments, central plant controller 102 can be distributed across multiple servers or computers (e.g., that can exist in distributed locations). In another exemplary embodiment, central plant controller 102 may integrate with a smart building manager that manages multiple building systems and/or combined with BAS 108.

Central plant controller 102 is shown to include a communications interface 104 and a processing circuit 106. Communications interface 104 may include wired or wireless interfaces (e.g., jacks, antennas, transmitters, receivers, transceivers, wire terminals, etc.) for conducting data communications with various systems, devices, or networks. For example, communications interface 104 may include an Ethernet card and port for sending and receiving data via an Ethernet-based communications network and/or a Wi-Fi transceiver for communicating via a wireless communications network. Communications interface 104 may be configured to communicate via local area networks or wide area networks (e.g., the Internet, a building WAN, etc.) and may use a variety of communications protocols (e.g., BACnet, IP, LON, etc.).

Communications interface 104 may be a network interface configured to facilitate electronic data communications between central plant controller 102 and various external systems or devices (e.g., BAS 108, subplants 12-22, etc.). For example, central plant controller 102 may receive information from BAS 108 indicating one or more measured states of the controlled building (e.g., temperature, humidity, electric loads, etc.) and one or more states of subplants 12-22 (e.g., equipment status, power consumption, equipment availability, etc.). Communications interface 104 may receive inputs from BAS 108 and/or subplants 12-22 and may provide operating parameters (e.g., on/off decisions, setpoints, etc.) to subplants 12-22 via BAS 108. The operating parameters may cause subplants 12-22 to activate, deactivate, or adjust a setpoint for various devices of equipment 60.

Still referring to FIG. 2, processing circuit 106 is shown to include a processor 110 and memory 112. Processor 110 may be a general purpose or specific purpose processor, an application specific integrated circuit (ASIC), one or more field programmable gate arrays (FPGAs), a group of processing components, or other suitable processing components. Processor 110 may be configured to execute computer code or instructions stored in memory 112 or received from other computer readable media (e.g., CDROM, network storage, a remote server, etc.).

Memory 112 may include one or more devices (e.g., memory units, memory devices, storage devices, etc.) for storing data and/or computer code for completing and/or facilitating the various processes described in the present disclosure. Memory 112 may include random access memory (RAM), read-only memory (ROM), hard drive storage, temporary storage, non-volatile memory, flash memory, optical memory, or any other suitable memory for storing software objects and/or computer instructions. Memory 112 may include database components, object code components, script components, or any other type of information structure for supporting the various activities and information structures described in the present disclosure. Memory 112 may be communicably connected to processor 110 via processing circuit 106 and may include computer code for executing (e.g., by processor 106) one or more processes described herein.

Still referring to FIG. 2, memory 112 is shown to include a building status monitor 134. Central plant controller 102 may receive data regarding the overall building or building space to be heated or cooled with central plant 10 via building status monitor 134. In an exemplary embodiment, building status monitor 134 may include a graphical user interface component configured to provide graphical user interfaces to a user for selecting building requirements (e.g., overall temperature parameters, selecting schedules for the building, selecting different temperature levels for different building zones, etc.).

Central plant controller 102 may determine on/off configurations and operating setpoints to satisfy the building requirements received from building status monitor 134. In some embodiments, building status monitor 134 receives, collects, stores, and/or transmits cooling load requirements, building temperature setpoints, occupancy data, weather data, energy data, schedule data, and other building parameters. In some embodiments, building status monitor 134 stores data regarding energy costs, such as pricing information available from utilities 126 (energy charge, demand charge, etc.).

Still referring to FIG. 2, memory 112 is shown to include a load/rate prediction module 122. Load/rate prediction module 122 may be configured to predict the thermal energy loads ($\hat{\ell}_k$) of the building or campus for each time step k (e.g., k=1 ... n) of a prediction period. Load/rate prediction module 122 is shown receiving weather forecasts from a weather service 124. In some embodiments, load/rate prediction module 122 predicts the thermal energy loads $\hat{\ell}_k$ as a function of the weather forecasts. In some embodiments, load/rate prediction module 122 uses feedback from BAS 108 to predict loads $\hat{\ell}_k$. Feedback from BAS 108 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate prediction module 122 receives a measured electric load and/or previous measured load data from BAS 108 (e.g., via building status monitor 134). Load/rate prediction module 122 may predict loads $\hat{\ell}_k$ as a function of a given weather forecast ($\hat{\phi}_w$), a day type (clay), the time of day (t), and previous measured load data ($Y_{k-1}$). Such a relationship is expressed in the following equation:

$$\hat{\ell}_k = f(\hat{\phi}w, \mathrm{day}, t | Y_{k-1})$$

In some embodiments, load/rate prediction module 122 uses a deterministic plus stochastic model trained from historical load data to predict loads $\hat{\ell}_k$. Load/rate prediction module 122 may use any of a variety of prediction methods to predict loads $\hat{\ell}_k$ (e.g., linear regression for the deterministic portion and an AR model for the stochastic portion).

Load/rate prediction module 122 is shown receiving utility rates from utilities 126. Utility rates may indicate a cost or price per unit of a resource (e.g., electricity, natural gas, water, etc.) provided by utilities 126 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 126 or predicted utility rates estimated by load/rate prediction module 122.

In some embodiments, the utility rates include demand charge rates for one or more resources provided by utilities 126. A demand charge may define a separate cost imposed by utilities 126 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, optimization module 128 may be configured to account for demand charges in the high level optimization process performed by high level optimization module 130.

Load/rate prediction module 122 may store the predicted loads $\hat{\ell}_k$ and the utility rates in memory 112 and/or provide the predicted loads $\hat{\ell}_k$ and the utility rates to optimization module 128. Optimization module 128 may use the predicted loads $\hat{\ell}_k$ and the utility rates to determine an optimal load distribution for subplants 12-22 and to generate on/off decisions and setpoints for equipment 60.

Still referring to FIG. 2, memory 112 is shown to include an optimization module 128. Optimization module 128 may perform a cascaded optimization process to optimize the performance of central plant 10. For example, optimization module 128 is shown to include a high level optimization module 130 and a low level optimization module 132. High level optimization module 130 may determine how to distribute thermal energy loads across subplants 12-22 for each time step in the prediction window in order to minimize the cost of energy consumed by subplants 12-22. Low level optimization module 132 may determine how to best run each subplant at the load setpoint determined by high level optimization module 130.

Advantageously, the cascaded optimization process performed by optimization module 128 allows the optimization process to be performed in a time-efficient manner. The low level optimization may use a relatively short time horizon or no time horizon at all due to the fast system dynamics compared to the time to re-optimize plant loads. The high level optimization may use a relatively longer time horizon when the dynamics and capacity of the thermal energy storage allow loads to be deferred for long time periods.

Low level optimization module 132 may generate and provide subplant power curves to high level optimization module 130. The subplant power curves may indicate the rate of utility use by each of subplants 12-22 (e.g., measured in units of power such as kW) as a function of the load served by the subplant. In some embodiments, low level optimization module 132 generates the subplant power curves based on equipment models 120 (e.g., by combining equipment models 120 for individual devices into an aggregate power curve for the subplant). Low level optimization module 132 may generate the subplant power curves by running the low level optimization process (described in greater detail with reference to FIGS. 5-7) for several different loads and weather conditions to generate multiple data points ($\dot{Q}_{subplant}$, kW). Low level optimization module 132 may fit a curve to the data points to generate the subplant power curves.

High level optimization module 130 may receive the load and rate predictions from load/rate prediction module 122 and the subplant power curves from low level optimization module 132. High level optimization module 130 may determine the optimal load distribution for subplants 12-22 (e.g., $\dot{Q}_{subplant}$ for each subplant) over the prediction window and provide the optimal load distribution to low level optimization module 132. In some embodiments, high level optimization module 130 determines the optimal load distribution by minimizing the total operating cost of central plant 10 over the prediction window. In other words, given a predicted load $\hat{\ell}_k$ and utility rate information from load/rate prediction module 122, high level optimization module 130 may distribute the predicted load $\hat{\ell}_k$ across subplants 12-22 to minimize cost.

In some instances, the optimal load distribution may include using TES subplants 20 and/or 22 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 20-22. The high level optimization may be described by the following equation:

$$\theta_{HL}^* = \arg \min_{\theta_{HL}} J_{HL}(\theta_{HL})$$

where $\theta^*_{HL}$ contains the optimal high level decisions (e.g., the optimal load $\dot{Q}$ for each of subplants 12-22) for the entire prediction period and $J_{HL}$ is the high level cost function.

To find the optimal high level decisions $\theta^*_{HL}$, high level optimization module 130 may minimize the high level cost function $J_{HL}$. The high level cost function $J_{HL}$ may be the sum of the economic costs of each utility consumed by each of subplants 12-22 for the duration of the prediction period. For example, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the prediction period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \max_{n_h}(u_{elec}(\theta_{HL}), u_{max,ele})$$

where $w_d$ is a weighting term, $c_{demand}$ is the demand cost, and the max( ) term selects the peak electricity use during the applicable demand charge period.

In some embodiments, high level optimization module 130 provides the optimal load distribution for each time step to low level optimization module 132 at the beginning of the time step. The optimal load distributions for subsequent time steps may be updated by high level optimization module 130 and provided to low level optimization module 132 at the beginning of subsequent time steps.

Low level optimization module 132 may use the subplant loads determined by high level optimization module 130 to determine optimal low level decisions $\theta^*_{LL}$ (e.g. binary on/off decisions, flow setpoints, temperature setpoints, etc.) for equipment 60. The low level optimization process may be performed for each of subplants 12-22. The low level optimization process performed by low level optimization module 132 is described in U.S. patent application Ser. No. 14/634,615 filed Feb. 27, 2015, the entire disclosure of which is incorporated by reference herein. Low level optimization module 132 may be responsible for determining which devices of each subplant to use and the setpoints for such devices that will achieve the subplant load setpoint while minimizing energy consumption. The low level optimization may be described using the following equation:

$$\theta_{LL}^* = \arg \min_{\theta_{LL}} J_{LL}(\theta_{LL})$$

where $\theta^*_{LL}$ contains the optimal low level decisions and $J_{LL}$ is the low level cost function.

To find the optimal low level decisions $\theta^*_{LL}$, low level optimization module 132 may minimize the low level cost function $J_{LL}$. The low level cost function $J_{LL}$ may represent the total energy consumption for all of the devices of equipment 60 in the applicable subplant. The lower level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 60 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimization module 132 may minimize the low level cost function $J_{LL}$ subject to inequality constraints based on the capacities of equipment 60 and equality constraints based on energy and mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off. In some embodiments, low level optimization module 132 performs the equipment level optimization without considering system dynamics. The optimization process may be slow enough to safely assume that the equipment control has reached its steady-state. Thus, low level optimization module 132 may determine the optimal low level decisions $\theta^*_{LL}$ at an instance of time rather than over a long horizon.

Low level optimization module 132 may determine optimum operating statuses (e.g., on or off) for a plurality of devices of equipment 60. Low level optimization module 132 may store code executable by processor 110 to execute operations as subsequently described in this application, including binary optimization operations and/or quadratic compensation operations. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimization module 132 may also determine optimum operating setpoints for equipment using nonlinear optimization. Nonlinear optimization may identify operating setpoints that further minimize the low level cost function $J_{LL}$. Low level optimization module 132 is described in greater detail with reference to FIG. 3.

Optimization module 128 is also shown to include a constraint modifier 202, according to some embodiments. As will be described in greater detail below, constraint modifier 202 is configured to modify one or more constraints for use by high level optimization module 130 in high level optimization processes, according to some embodiments. As shown in FIG. 2, the constraint modifier 202 is shown to receive equipment schedules comprising at least one of minimum on schedules, minimum off schedules, and must run schedules. In some embodiments, the schedules received by constraint modifier 202 define operational requirements (e.g., must be on, must be off, for a particular amount of time, etc.) at each time step in an optimization horizon for each of the devices included in the subplants in which central plant controller 102 is implemented. Using the minimum on schedules, minimum off schedules, and/or must run schedules for each of the devices, the constraint modifier 202 generates one or more modified constraints (e.g., modified upper bound, modified lower bound, etc.) based on the operational requirements defined by the various schedules. In some embodiments, constraint modifier 202 is configured to use minimum on schedules, minimum off schedules, and must run schedules for each of the devices included in the central plant in which central plant controller 102 is implemented in order to determine conflicting constraints between different devices in future time steps.

Optimization module 128 is also shown to include a binary optimization modifier 204, according to some embodiments. As will be described in greater detail below, the binary optimization modifier 204 is configured to provide simplified binary optimization solutions to low level optimization module 132 for use in determining one or more devices to operate at a particular time step. The simplified binary optimization solutions may include a starting node on a branch and bound tree and/or simplified branch and bound trees (e.g., removing of infeasible branch and bound solutions). In some embodiments, binary optimization modifier 204 is configured to receive data identifying one or more previously dispatched combinations of devices from a previous time step in order to adjust one or more constraints to account for equipment hysteresis.

Still referring to FIG. 2, memory 112 is shown to include a subplant control module 138. Subplant control module 138 may store historical data regarding past operating statuses, past operating setpoints, and instructions for calculating and/or implementing control parameters for subplants 12-22. Subplant control module 138 may also receive, store, and/or transmit data regarding the conditions of individual devices of equipment 60, such as operating efficiency, equipment degradation, a date since last service, a lifespan parameter, a condition grade, or other device-specific data. Subplant control module 138 may receive data from subplants 12-22 and/or BAS 108 via communications interface 104. Subplant control module 138 may also receive and store on/off statuses and operating setpoints from low level optimization module 132.

Data and processing results from optimization module 128, subplant control module 138, or other modules of central plant controller 102 may be accessed by (or pushed to) monitoring and reporting applications 136. Monitoring and reporting applications 136 may be configured to generate real time "system health" dashboards that can be viewed and navigated by a user (e.g., a central plant engineer). For example, monitoring and reporting applications 136 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of a chilled water system.

Still referring to FIG. 2, central plant controller 102 may include one or more GUI servers, web services 114, or GUI engines 116 to support monitoring and reporting applications 136. In various embodiments, applications 136, web services 114, and GUI engine 116 may be provided as separate components outside of central plant controller 102 (e.g., as part of a smart building manager). Central plant controller 102 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 102 may be configured to provide the results of any such processing to other databases, tables, XML files, or other data structures for further querying, calculation, or access by, for example, external monitoring and reporting applications.

Central plant controller 102 is shown to include configuration tools 118. Configuration tools 118 can allow a user to define (e.g., via graphical user interfaces, via prompt-driven "wizards," etc.) how central plant controller 102 should react to changing conditions in the central plant subsystems. In an exemplary embodiment, configuration tools 118 allow a user to build and store condition-response scenarios that can cross multiple central plant devices, multiple building systems, and multiple enterprise control applications (e.g., work order management system applications, entity resource planning applications, etc.). For example, configuration tools 118 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 118 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 3:
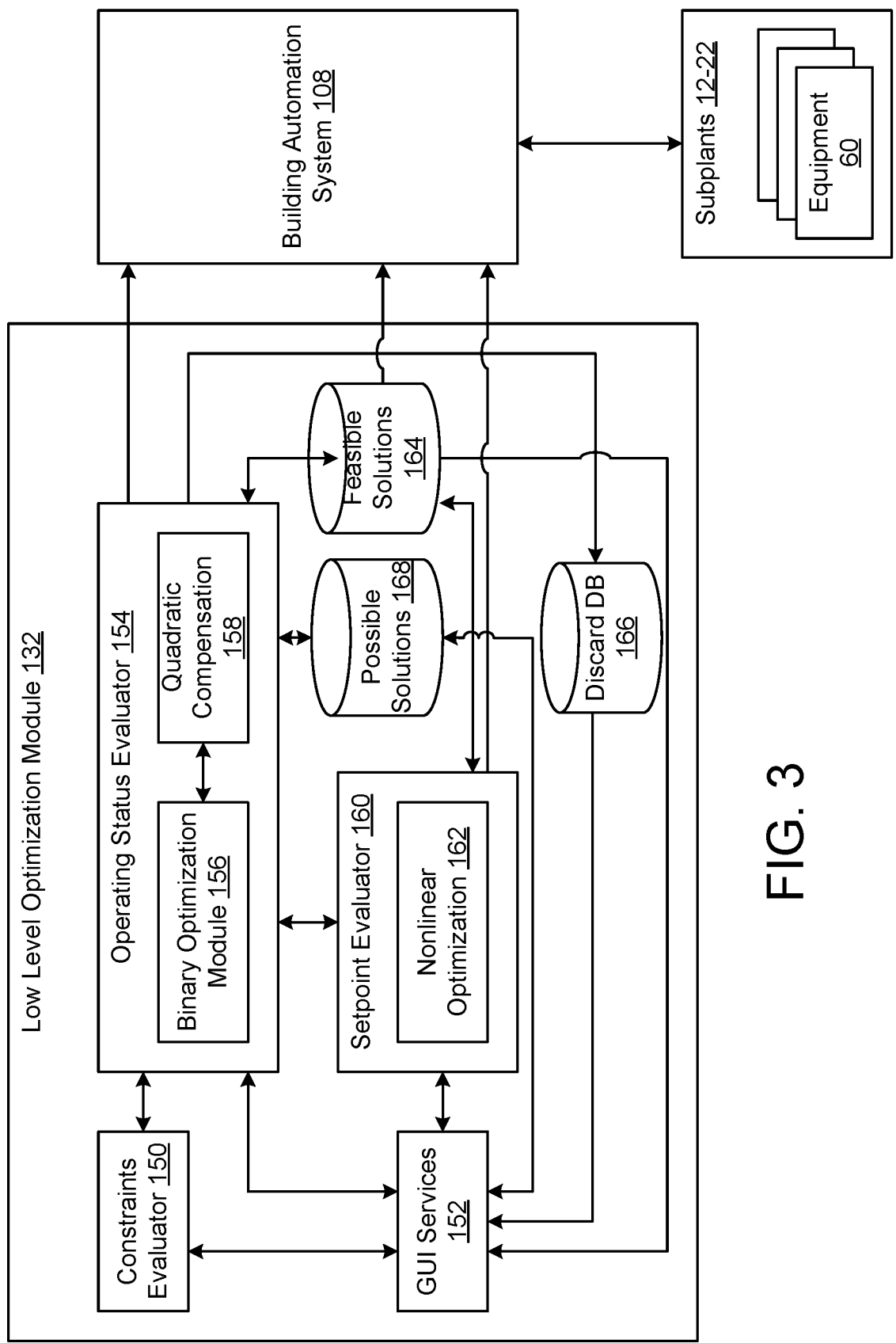
FIG. 3 is a block diagram illustrating a low level optimization module of the central plant controller of FIG. 2 in greater detail, according to an exemplary embodiment.

Referring now to FIG. 3, a block diagram illustrating low level optimization module 132 in greater detail is shown, according to an exemplary embodiment. Low level optimization module 132 may store computer code (e.g., a set of executable computer code instructions stored in non-transitory computer-readable media) that is executable by processor 110. Low level optimization module 132 may be configured to generate and output operating status commands and setpoints for equipment 60 via, e.g., communications interface 104. The operating status commands (e.g., on/off) and setpoints output to the equipment 60 of a particular subplant may be estimated (e.g., by low level optimization module 132) to minimize the power consumption of the subplant.

Low level optimization module 132 is shown to include an operating status evaluator 154. Operating status evaluator 154 may examine a plurality of potential device on/off combinations to select a combination for use by central plant 10. For example, if chiller subplant 16 has four chillers (i.e., chiller 1, chiller 2, chiller 3, and chiller 4), a potential on/off combination may be [1, 0, 0, 1] indicating that chiller 1 is on, chiller 2 is off, chiller 3 is off, and chiller 4 is on. In some instances, the operating status of a particular device may be unspecified (e.g., corresponding to a node that has not yet been evaluated) and may be represented with a question mark. For example, the combination [1, 0, ?, ?] may indicate that chiller 1 is on, chiller 2 is off, and chillers 3-4 have an unspecified operating status. An unspecified operating status does not necessarily indicate that the operating status is unknown, but rather that the operating status for the corresponding device has not yet been evaluated and is not fixed by the combination. For example, the combination [1, 0, 0, ?] fixes the operating status of chiller 1, chiller 2, and chiller 3, but indicates that it is possible for chiller 4 to be either on or off and still satisfy the combination. In an exemplary embodiment, operating status evaluator 154 uses binary optimization and quadratic compensation to determine which combination of on/off states to select for use. Modules 156 and 158 (described in greater detail below) provide instructions for implementing the binary optimization and quadratic compensation, respectively.

Low level optimization module 132 is shown to include possible solutions database 168, a feasible solution database 164, and discard database 166. Possible solutions database 168 may contain on/off combinations that are estimated to be capable of satisfying the thermal energy load and the optimization constraints for the subplant. A combination may be stored in possible solutions database if the combination can potentially satisfy all of the applicable constraints (e.g., subplant load constraints, device capacity constraints, etc.), considering any unspecified operating statuses as wildcards. For example, if the combination [1, 1, 0, 1] satisfies the constraints but the combination [1, 1, 0, 0] does not, the combination [1, 1, 0, ?] would satisfy the constraints because the unspecified operating status can be either on (1) or off (0). Possible solutions database 168 stores possible combinations (i.e., combinations that satisfy plant load requirements and system constraints) that may or may not result in the lowest power consumption.

Discard database 166 may contain combinations currently known or estimated to be unable to satisfy subplant load and/or system constraint requirements. Discard database 166 may store infeasible combinations of devices (i.e., combinations that cannot possibly satisfy plant load requirements and/or system constraints) regardless of the operating statuses of any devices with an unspecified operating status. For example, if both of the combinations [1, 1, 0, 1] and [1, 1, 0, 0] fail to satisfy the constraints, the combination [1, 1, 0, ?] would also fail to satisfy the constraints because no value of the unspecified operating status would cause the combination to satisfy the constraints.

Feasible solutions database 164 may contain potential combinations that are capable of satisfying the subplant load and system constraint requirements, and additionally do so with a minimum energy consumption. In some embodiments, feasible solutions database 164 stores the optimal combination of on/off statuses (i.e., the combination that results in the minimum energy consumption). In some embodiments, feasible solutions database 164 stores combinations that satisfy all applicable constraints, regardless of the value of any unspecified operating status. For example, if both of the combinations [1, 1, 0, 1] and [1, 1, 0, 0] satisfy the constraints, the combination [1, 1, 0, ?] may be stored as a feasible combination because any value of the unspecified operating status would cause the combination to satisfy the constraints. Databases 164, 166, and 168 may store the potential combinations in any suitable data structure or data structures, including linked lists, trees, arrays, relational database structures, object-based structures, or other data structures.

Operating status evaluator 154 may receive possible combinations of on/off statuses from possible solutions database 168. Operating status evaluator 154 may evaluate the combinations in possible solutions database 168 in view of the currently applicable constraints (e.g., subplant load, device capacities, etc.) and store various combinations in possible solutions database 168, feasible solutions database 164, and/or discard database 166 based on a result of the evaluation. In some embodiments, operating status evaluator 154 periodically evaluates new combinations (e.g., those which have not recently been evaluated as a potentially optimal solution) from feasible solutions database 164 and/or discard database 166 for further evaluation. Moreover, as new devices are brought online, such new devices and new combinations including the new devices can be added to feasible solutions database 164 for consideration by operating status evaluator 154.

Operating status evaluator 154 may receive constraints on the low level optimization process from constraints evaluator 150. Constraints may include, for example, maximum device capacities, energy or mass balance constraints, minimum device capacities, etc. The constraints may establish minimum and/or maximum parameters for equipment 60. In some embodiments, the constraints are automatically generated quantities based on, e.g., historical data. In other embodiments, an operator of the central plant system may set and/or modify the constraints. The constraints include, for example, that each device of the subplant system operate with a minimum load (such as 30%). This requirement may advantageously ensure that power is being consumed efficiently (i.e., the work done by the device is sufficient to justify the power required to operate the device). The constraints may also include that the total power of the chiller plant be less than a maximum. This requirement may advantageously prevent the subplant from becoming overloaded.

Operating status evaluator 154 may use the constraints to identify feasible on/off configurations. Operating status evaluator 154 may provide a potential on/off combination to constraint evaluator 150, which may be configured to check the potential combination relative to the current constraints. If a potential combination cannot meet the current constraints, operating status evaluator 154 may move the potential combination to discard database 166 and/or remove the potential combination from feasible solutions database 164.

Still referring to FIG. 3, operating status evaluator 154 is shown to include a binary optimization module 156 and a quadratic compensation module 158. Binary optimization module 156 may include computer code instructions for optimizing (e.g., minimizing) the low level cost function $J_{LL}$ representing the energy consumption of a subplant. According to an exemplary embodiment, binary optimization module 156 uses a branch and bound method to perform the binary optimization.

Quadratic compensation module 158 may include computer code instructions configured to compensate for the nonlinear nature of the system. For example, quadratic compensation module 158 may account for the power consumption of some devices of equipment 60 having a quadratic form (i.e., not a linear form). Quadratic compensation module 158 may be selectively utilized when the power consumption of the devices being considered by operating status evaluator 154 is quadratic.

Quadratic compensation module 158 may advantageously account for the fact that the binary optimization performed by binary optimization module 156 is intended for a linear system, but the power consumption of a particular device is a quadratic function. For example, in a purely linear system, binary optimization will typically return the fewest devices required to meet plant load. If turning two devices on will meet the plant load, then other combinations may not be considered, even if the power consumption of other combinations is lower. In an exemplary embodiment, however, alternative embodiments are identified and then compared using the assistance of quadratic compensation module 158 (or another nonlinear compensation).

Because chiller power is not linear, quadratic compensation may be conducted on every device having a nonlinear or quadratic power curve, advantageously checking for whether the lowest power combination of devices is achieved by adding another device. For example, binary optimization module 156 may identify a combination of devices that meets plant load (e.g., two devices on). The binary search may continue by looking ahead to a combination with the next device activated rather than deactivated. For example, even if two devices turned on would meet a plant load, the binary search may use each device's quadratic power curve to consider the expected power change with three devices turned on. The power consumption per device may decrease as additional devices are turned on because one or more of the devices may operate more efficiently at a lower capacity than a higher capacity. The net power consumption may therefore decrease as a result. If three devices on results in lower power, then it is a more optimal solution than two devices on. On the other hand, despite efficiencies gained in the original "on" devices by turning another device on, the overhead energy consumption added by turning on the additional device may result in a determination that the additional device should not be turned on.

Still referring to FIG. 3, low level optimization module 132 is shown to include a setpoint evaluator 160. Setpoint evaluator 160 may be configured to examine one or more combinations of active (e.g., "on") devices to determine optimal operating setpoints. The optimal operating setpoints may be estimated to minimize power consumption while achieving the subplant load setpoint and satisfying other constraints on the low level optimization process. According to an exemplary embodiment, setpoint evaluator 160 estimates the optimal temperature setpoints (e.g., hot water temperature setpoint, condenser water temperature setpoint, chilled water temperature setpoint, etc.), flow rate setpoints (e.g., flow rates through individual heating elements 30, chillers 42, heat recovery chillers 36, cooling towers 48, etc.), and/or pressure setpoints (e.g., hot water differential pressure, chilled water differential pressure, etc.) for a given combination of active devices of equipment 60. In other embodiments, more, fewer, or different setpoints may be determined.

Setpoint evaluator 160 may receive one or more potential on/off combinations from operating status evaluator 154 and/or possible solutions database 168. Setpoint evaluator 160 may move potential combinations to discard database 166 when the combinations are determined to be infeasible or when a potential combination is repeatedly identified as not being efficient relative to other solutions. In certain situations, setpoint evaluator 160 may also move potential combinations to feasible solutions database 164 (e.g., when a combination is estimated to minimize power consumption compared to other combinations).

Still referring to FIG. 3, setpoint evaluator 160 is shown to include a nonlinear optimization module 162. Nonlinear optimization module 162 may include computer code for optimizing (e.g., minimizing) the low level cost function $J_{LL}$ for a set of active central plant devices (e.g., devices that are "on"). The operating status (e.g., on/off) of the devices may have been previously determined using operating status evaluator 154. According to various embodiments, nonlinear optimization module 162 performs a nonlinear optimization using direct or indirect search methods. For example, nonlinear optimization module 162 may use a Nelder-Mead or downhill simplex method, Generalized Reduced Gradient (GRG), Sequential Quadratic Programming (SQP), Steepest Descent (Cauchy Method), Conjugate Gradient (Fletcher-Reeves Method), or other nonlinear optimization methods.

Low level optimization module 132 is shown to include GUI services 152. GUI services 152 may be configured to generate graphical user interfaces for central plant controller 102 or another server to provide to a user output device (e.g., a display, a mobile phone, a client computer, etc.). The graphical user interfaces may present or explain the active combination of devices, system efficiencies, system setpoints, system constraints, or other system information. GUI services 152 may facilitate a user's (e.g., a central plant engineer's) ability to track energy usage and operating statuses of the central plant devices via, e.g., a web-based monitoring application. GUI services 152 may additionally allow a user to manually set and update system constraints, available devices, certain thresholds (e.g., for moving a combination to a discard set) optimum off/on operating statuses, and optimum operating setpoints.

Figure 4:
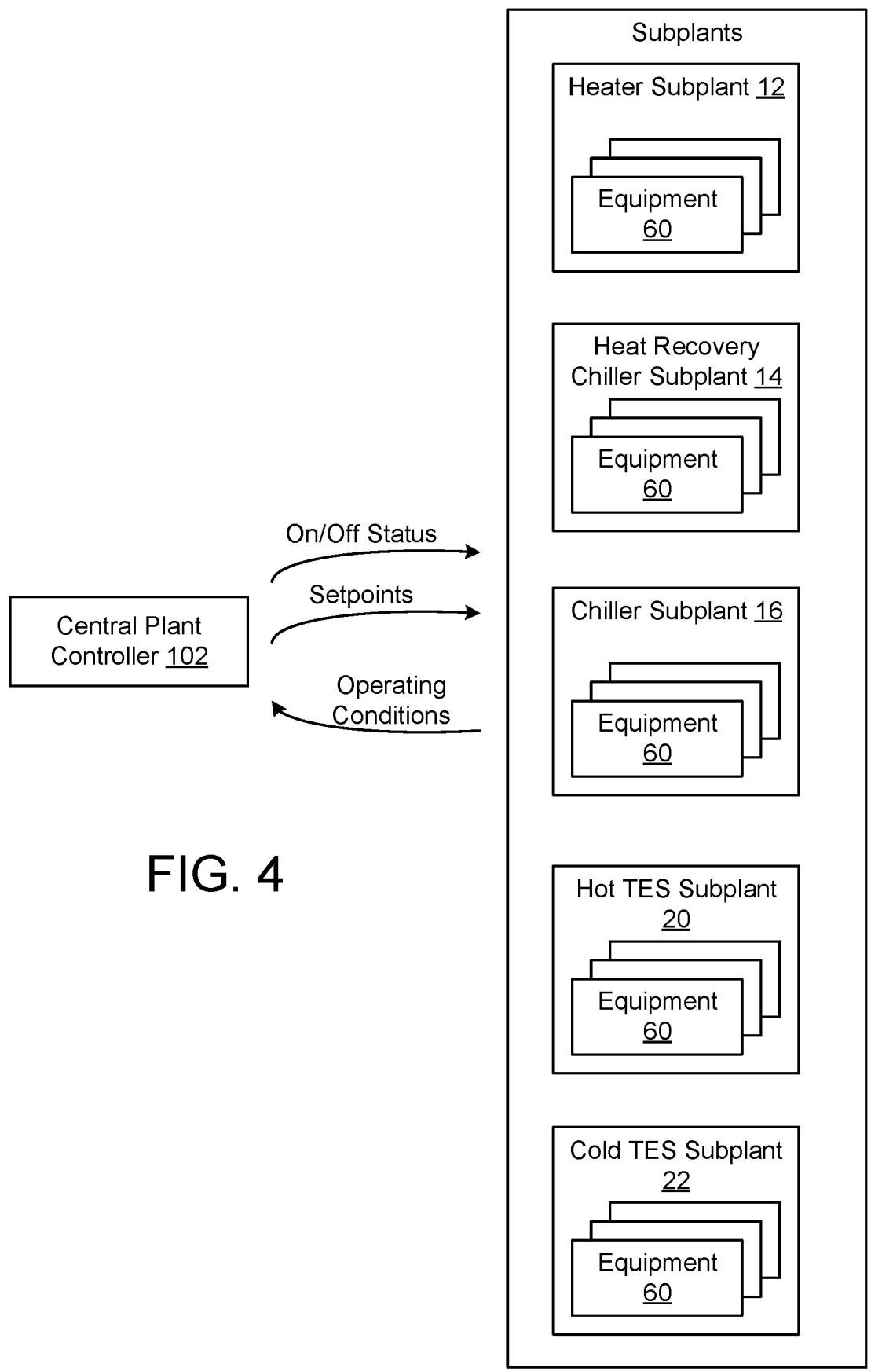
FIG. 4 is a block diagram illustrating the central plant controller of FIG. 2 receiving operating conditions from the plurality of subplants of FIG. 1 and providing generated on/off statuses and operating setpoints as operating commands for the central plant equipment, according to an exemplary embodiment.

Referring now to FIG. 4, a block diagram illustrating central plant controller 102 and subplants 12-22 is shown, according to an exemplary embodiment. Central plant controller 102 is configured to transmit determined on/off statuses and operating setpoints to subplants 12-22 and/or the equipment 60 within each subplant. Communication between central plant controller 102 and equipment 60 may be direct (as shown in FIG. 4) or via one or more intermediaries (e.g., BAS 108, subplant level controllers, etc.). Central plant controller 102 and subplants 12-22 may transmit and receive data automatically, without a user's intervention. In other embodiments, a user may additionally provide manual inputs or approvals to central plant controller 102 and/or subplants 12-22.

The number of active devices of equipment 60 within each subplant may depend on the load on the subplant. In some embodiments, equipment 60 may be coupled to a local controller that receives and implements the operating statuses and setpoints from central plant controller 102. The local controller may be configured to transmit operating conditions about equipment 60 back to central plant controller 102. For example, a local controller for a particular device may report or confirm current operating status (on/off), current operating load, device energy consumption, device on/run time, device operating efficiency, failure status, or other information back to central plant controller 102 for processing or storage. The performance of equipment 60 may be evaluated using a coefficient of performance (COP), a power consumption per plant load (KW/ton) value, or another value indicative of power efficiency or consumption.

Constraint Modifier and Binary Optimization Modifier

Figure 5:
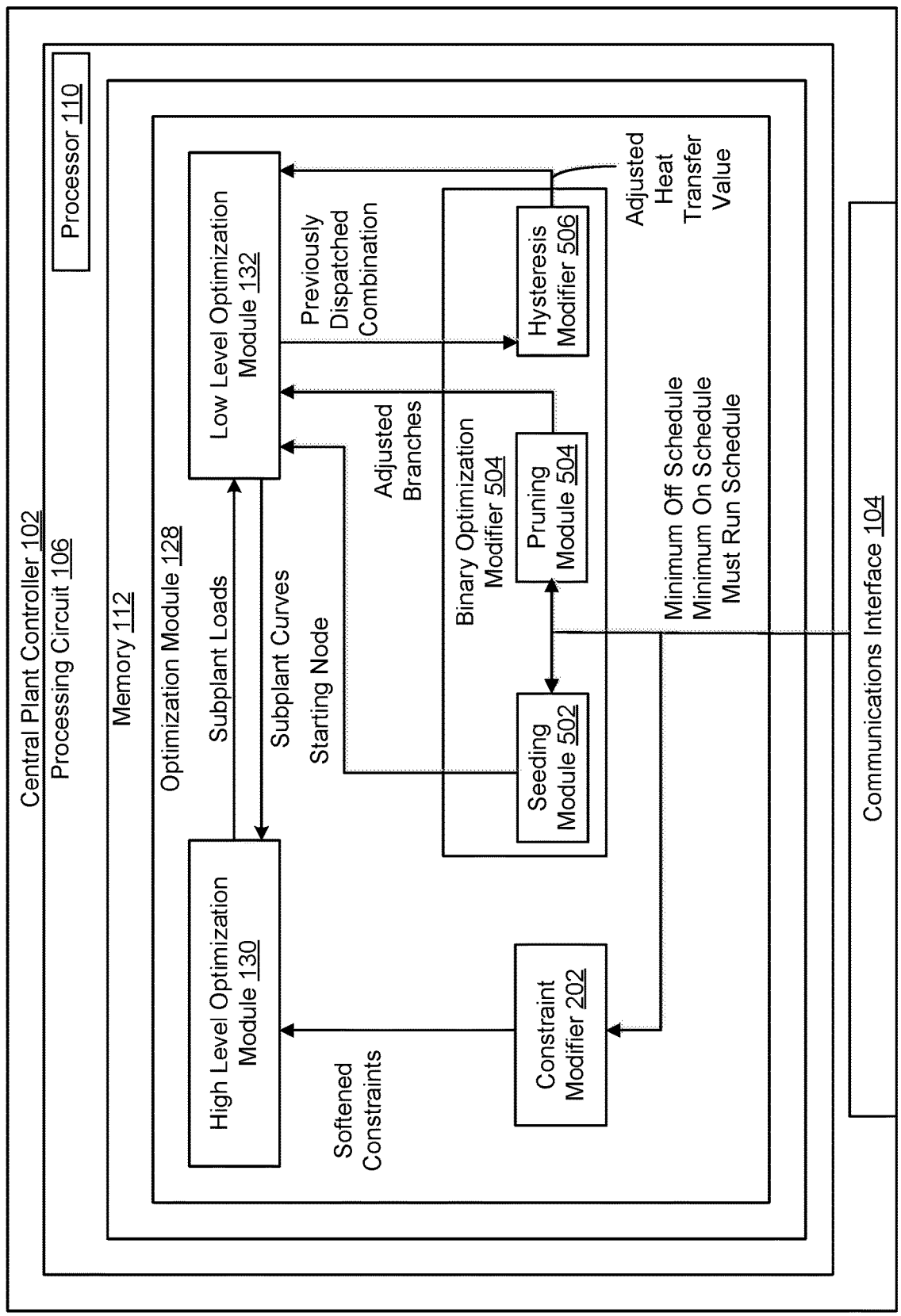
FIG. 5 is a block diagram illustrating a constraint modifier of the central plant controller of FIG. 2 in greater detail, according to some embodiments.

Referring now to FIG. 5, the constraint modifier 202 is configured to analyze various data (e.g., previous combinations of dispatched devices, operational requirements of devices at specific devices, specific user input, etc.) and generate adjustments to constraints (e.g., upper bound constraints, lower bound constraints, etc.) used by high level optimization module 130 in high level optimization processes, according to some embodiments. The binary optimization modifier 204 is configured to analyze various operational requirements (e.g., defined by various equipment schedules) and historical data to generated modified solutions and/or values (e.g., adjusted heat transfer values, starting nodes, etc.) used by low level optimization module 132 for determining the optimal combination of devices, according to some embodiments. As was described with reference to FIG. 3, the low level optimization module 132 is configured to determine optimal dispatch combinations of devices (e.g., operating status of devices) of the devices included in a central plant (e.g., central plant 10). The binary optimization modifier 204 can provide modified inputs used by the low level optimization module 132 in determining the operating status of devices. Advantageously, by accounting for various operational requirements and/or previous equipment dispatch, the binary optimization modifier 204 can reduce the number of iterations of binary optimization processes performed by the low level optimization module 132 to generate optimal dispatch combinations of devices.

Referring now to FIG. 5, a detailed block diagram illustrating optimization module 128 including constraint modifier 202, binary optimization modifier 204 and modules included therein as implemented in central plant controller 102 is shown, according to some embodiments. As previously described, constraint modifier 202 is configured to receive, by user inputs transmitted via communications interface 104, at least one of a minimum off schedule, minimum on schedule, and a must run schedule for one or more devices, each of which define operational requirements of the one or more devices. The constraint modifier 202 uses the at least one of a minimum off schedule, minimum on schedule, and must run schedule to determine softened modified constraints for use by high level optimization module 130 in high level optimization processes. The binary optimization modifier 204 and various components included therein are configured to receive, by user inputs transmitted via communications interface 104, at least one of a minimum off schedule, minimum on schedule, and a must run schedule for one or more devices, each of which define operational requirements of the one or more devices. The various schedules received by the binary optimization modifier 204 may comprise at least one of the same or substantially similar schedule information as received one or more schedules received by constraint modifier 202. In some embodiments, constraint modifier 202 is configured to detect conflicts between the adjusted constraints at a future time step in the optimization horizon and determines which of the constraints involved in the conflict is prioritized. In some embodiments, as will be described in greater detail with reference to FIG. 6, binary optimization modifier 204 is configured to receive data associated with previously dispatched combinations of devices and determine an adjusted heat transfer values for use by low level optimization module 132.

Binary optimization modifier 204 is shown to include a hysteresis modifier 506 configured to generate one or more adjusted heat transfer values for use by low level optimization module 132 to determine an optimal device dispatch combination, according to some embodiments. In some embodiments, hysteresis modifier 506 is configured to receive one or more previously dispatched combinations of devices for one or more subplants in a central plant determined by low level optimization module 132 for a previous time step. For example, the previous dispatched combination of devices for a chiller subplant indicating the dispatch of a first chiller device for time step $t=1$ may be received by hysteresis modifier 506 when the optimization module 128 is optimizing for the time step $t=2$. As will be described in greater detail with reference to FIG. 6, in some embodiments, hysteresis modifier 506 is configured to use the one or more previously dispatched combinations of devices to generate an adjusted heat transfer value for each of the one or more previous dispatch combinations for use by low level optimization module 132. In some embodiments, the adjusted heat transfer value generated by the hysteresis modifier 506 is used to prioritize the selection of a previous dispatched combination of devices.

Binary optimization modifier 204 is also shown to include a seeding module 502 configured to determine a starting node for one or more of the binary optimization processes performed by low level optimization module 132, according to some embodiments. In some embodiments, as will be described in greater detail with reference to FIG. 9, seeding module 502 is configured to receive a minimum on schedule and/or a must run schedule from a source (e.g., a user, an equipment database, etc.) via communications interface 104 and determine one or more devices required to operate at one or more future time steps based on the required operation of one or more devices identified in the minimum on schedule and/or must run schedule. In some embodiments, seeding module 502 is configured to output the one or more starting nodes to low level optimization module 132 for use in a binary optimization process to determine one or more feasible combination of devices to dispatch in one or more future time steps.

Still referring to FIG. 5, constraint modifier 202 is shown to include a pruning module 504 configured to determine one or more infeasible combinations of devices for one or more of the binary optimization processes performed by low level optimization module 132, according to some embodiments. In some embodiments, as will be described in greater detail with reference to FIG. 12, pruning module 504 is configured receive a minimum off schedule from a source (e.g., a user, an equipment database, etc.) via communications interface 104 and determine one or more infeasible combination of devices at one or more future time steps using the minimum off schedule. Based on the infeasible combinations of devices identified by the pruning module 504 using the minimum off schedule, the pruning module 504 generates adjusted branches of the binary optimization tree (e.g., combinations of devices in a particular subplant) that disregard any infeasible combinations of devices as a possible solution. In some embodiments, pruning module 504 outputs one or more adjusted branches based on the infeasible combinations to low level optimization module 132 for use in binary optimization algorithms to determine one or more feasible combinations of devices to dispatch in one or more future time steps.

Modifying Constraints for Device Hysteresis

Figure 6:
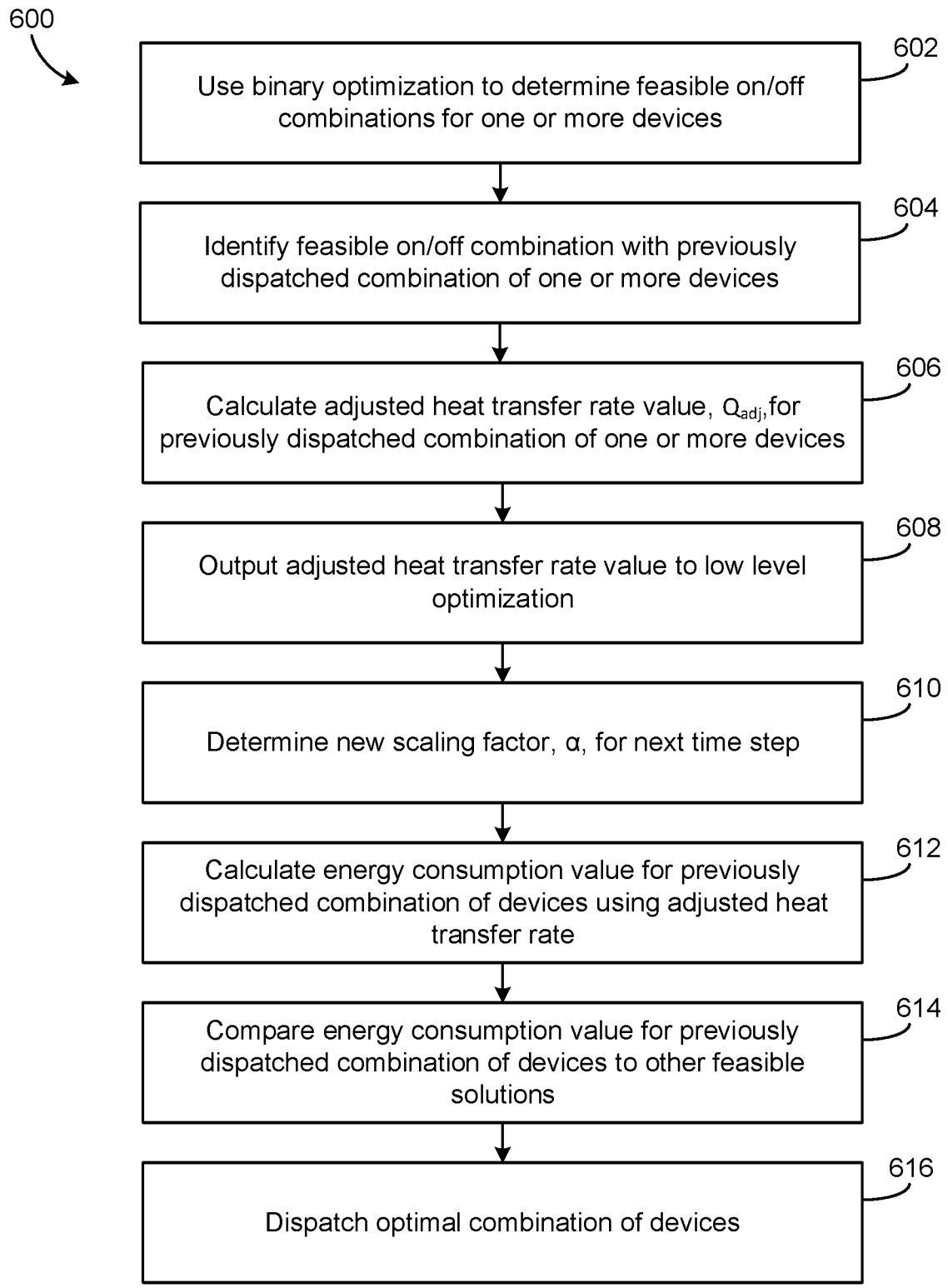
FIG. 6 is a flowchart illustrating a process of accounting for equipment hysteresis in device selection, according to some embodiments.

Referring now to FIG. 6, a flowchart is shown illustrating a process 600 to account for equipment hysteresis when determining an optimal equipment dispatch is shown, according to some embodiments. Advantageously, the process 600 substantially prevents the cycling of devices between an on state and an off state by influencing the low level optimizer to select a previously dispatched combination of devices rather than a new combination of devices by calculating an adjusted heat transfer rate value for the previously dispatched combination of devices, according to some embodiments. In some embodiments, process 600 is performed by hysteresis modifier 506 to calculate an adjusted heat transfer rate value associated with a previously dispatched combination of devices and transmit the adjusted heat transfer rate value to low level optimization module 132. In some embodiments, the previously dispatched combination of devices associated with the adjusted heat transfer rate value calculated in process 600 is detected by the low level optimization module 132 as an optimal combination of devices for dispatching in the next time step. In some embodiments, the low level optimization module 132 selects the previously dispatched combination of devices associated with the adjusted heat transfer rate value to operate in one or more future time steps. Process 600 can be performed for each subplant included in a central in which the central plant controller 102 is implemented.

Process 600 is shown to involve using a binary optimization algorithm (e.g., branch and bound) to determine all feasible on/off combinations for one or more devices included in a particular subplant (step 602). As previously described, the binary optimization algorithm (as can be performed by binary optimization module 256) is used to generate one or more feasible combinations of devices to dispatch in one or more future time steps. In some embodiments, step 602 is performed by low level optimization module 132. In some embodiments, step 602 is repeated for all subplants included in the central plant being controlled by central plant controller 102. In some embodiments, the feasible on/off combinations determined in step 602 consists of one feasible combination (e.g., the previously dispatched combination of devices). In some embodiments, the feasible on/off combinations determined in step 602 consists of more than one feasible combination. In some such embodiments, there is at least one feasible combination that is different (e.g., an operating state of at least one device is different) than a previously dispatched combination of devices.

Still referring to FIG. 6, process 600 is shown to involve identifying a previously dispatched combination of devices based on the feasible on/off combinations for one or more devices (step 604). In some embodiments, the previously dispatched combination of devices identified is determined using the dispatched combination of devices from a previous time step. For example, while performing process 600 for a chiller subplant for time step $t=2$, a first chiller device and a third chiller device that were dispatched at time step $t=1$ (i.e., a second chiller device was not dispatched at $t=1$) may be identified as a previously dispatched combination of one or more devices. In some embodiments, the previously dispatched combination of devices identified in step 604 is transmitted from low level optimization module 132 to hysteresis modifier 506.

Process 600 is shown to involve calculating an adjusted heat transfer rate value for the previously dispatched combination of one or more devices (step 606), according to some embodiments. In some embodiments, hysteresis modifier 506 calculates the adjusted heat transfer rate value for the previously dispatched combination of one or more devices. In some embodiments, the adjusted heat transfer rate value is calculated to influence the selection of the previously dispatch combination of one or more device as an optimal combination for dispatch in the next time step. For example, low level optimization module 132 selects an optimal combination of devices based on minimal power consumption (e.g., calculated using heat transfer rate value) of the devices included in a particular subplant. As a result, the adjusted heat transfer rate value calculated in step 606 may be adjusted such that the adjusted heat trans rate value is less than one or more other feasible combinations of devices as can be determined in step 602. The adjusted heat transfer rate value can be represented with the following equation:

$$Q_{adj} = Q_{HL} - Q_{sub}$$

where $Q_{adj}$ is the adjusted heat transfer rate value, $Q_{HL}$ is the heat transfer rate value allocated to the particular subplant determined by the high level optimization, and $Q_{sub}$ is percentage of a ratio of the total capacities of the enabled devices in a subplant to the number of enabled devices. $Q_{sub}$ may be calculated using the following equation:

$$Q_{sub} = \frac{\Sigma \text{ Capacities of Enabled Device}}{\Sigma \text{ Number of Enabled Devices}} * \alpha$$

where the numerator consists of summing the capacities of each of the enabled devices in a particular subplant, the denominator consists of summing the number of enabled devices in a particular subplant, and alpha is a scaling factor.

Process 600 is shown to involve outputting the calculated adjusted heat transfer rate value calculated to low level optimization module 132 (step 608), according to some embodiments. In some embodiments, the adjusted heat transfer rate value is transmitted from hysteresis modifier 506 to low level optimization module 132. In some embodiments, as will be described in greater detail below, the adjusted heat transfer rate value is transmitted to low level optimization module 132 for use in determining an optimal combination of devices for a particular subplant.

Still referring to FIG. 6, process 600 is shown to involve determining a new scaling factor α (step 610), according to some embodiments. In some embodiments, determining a new scaling factor involves collecting a decay value from a user. In some such embodiments, a decay value is a predetermined decimal value by which the scaling factor is multiplied in each consecutive time step, thereby reducing the value of the scaling factor in each future time step. In some embodiments, the decay value is used to determine a new scaling factor for each subsequent time step. For example, consider a scaling factor of α=1 applied at a time step of t=1. A decay value of d=0.1 is applied to the scaling factor α starting at time step t=2, thereby resulting in a scaling factor of α=0.1 for time step t=2. In some embodiments, constraint modifier 202 can be configured to calculate a new scaling factor without input from a user. In some such embodiments, constraint modifier 202 automatically reduces a particular scaling factor for each consecutive time step using a predetermined decay value stored in the memory of central plant controller 102.

Process 600 is shown to involve calculating an adjusted energy consumption value for the previously dispatched combination of devices using the adjusted heat transfer rate $Q_{adj}$ (step 612), according to some embodiments. The energy consumption of the previously dispatched combination of devices can be represented with the function:

$$E_{adj} = t_s \cdot Q_{adj}$$

where $E_{adj}$ is the adjusted energy consumption value for the previously dispatched combination of devices, $t_s$ is the duration of a time step, and $Q_{adj}$ is the adjusted heat transfer rate for the determined previously dispatched combination of devices determined.

Process 600 is shown to involve comparing the adjusted energy consumption value calculated for the currently dispatched combination of devices to each of the energy consumption values calculated for each other feasible on/off combinations as determined by a binary optimization process performed by low level optimization module 132 (step 614), according to some embodiments. In some embodiments, step 614 involves comparing each energy consumption value to determine the combination of devices associated with the lowest energy consumption value.

Process 600 is shown to involve dispatching the determined combination of devices associated with the lowest energy consumption value for operation (step 616), according to some embodiments. In some embodiments, the previously dispatched combination of devices is dispatched in step 616 where the energy consumption value calculated with the adjusted heat transfer rate value for the previously dispatched combination of devices is less than all other energy consumption values associated with all other feasible on/off combinations of devices.

Using Minimum on Schedules to Determine Modified Constraints

Figure 7:
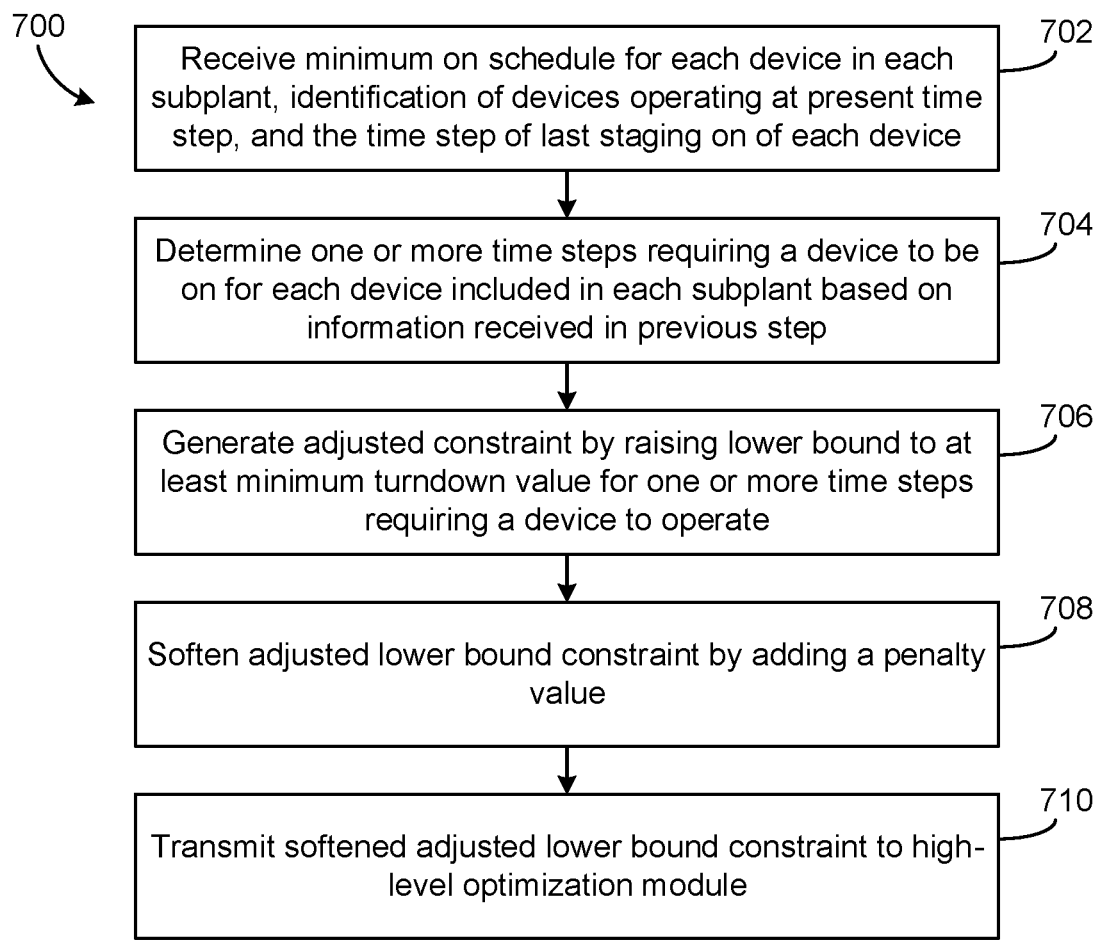
FIG. 7 is a flowchart illustrating a process of implementing a minimum on schedule in an optimization process, according to some embodiments.

Referring now to FIG. 7, a process 700 for using a minimum on schedule to determine modified constraints is shown, according to some embodiments. In some embodiments, the process 700 is performed by constraint modifier 202 to determine one or more devices in a particular subplant required to be operating at one or more time steps based on a minimum on schedule associated with the particular subplant. In some embodiments, the process 700 for using a minimum on schedule to determine adjusted constraints is performed by constraint modifier 202 to provide the adjusted constraints to high level optimization module 130 for use in one or more high level optimization processes to determine one or more subplant allocations. In some embodiments, as will be described in greater detail with reference to FIG. 14, a minimum on schedule associated with a particular device contains a recycle-off timer allowing for the particular device to turn on within a specified time period from the last time step at which the particular device switch from an off state to an on state.

Process 700 is shown to involve receiving a minimum on schedule for each device, identification of one or more devices operating at a present time step, and the last time step at which each device was dispatched (step 702), according to some embodiments. In some embodiments, the minimum on schedule for a particular device identifies a required number of consecutive time steps at which the particular device must be operating. For example, a minimum on schedule for a chiller may identify that the chiller must operate for 4 consecutive time steps following the time step at which the chiller begins operating. In some embodiments, the minimum on schedule for a particular device identifies specific time steps at which the particular device must be operating. For example, a minimum on schedule for a chiller may identify that the chiller must operate at the time step t=4. In some embodiments, the minimum on schedule for a particular device identifies a combination of the operational requirements previously stated. For example, a minimum on schedule for a chiller may identify that the chiller must operate at the time step t=4 and must operate for four consecutive time steps following the time step at which the chiller began operating (i.e., the chiller operates for time steps t=4:8). In some embodiments, step 702 involves receiving an identification of one or more devices operating at a present time step. For example, while optimizing for the next time step in the optimization horizon (e.g., t=4), a chiller may be identified as operating at the present time step (i.e., t=3). In some embodiments, step 702 involves receiving the most recent time step at which each device began operating. For example, while optimizing for the next time step in the optimization horizon (e.g., t=4), a chiller may be identified as beginning operation at a time step of t=2.

Process 700 is shown to involve determining one or more time steps at which a particular device is required to be operating based on the received information (step 704), according to some embodiments. In some embodiments, step 704 involves analyzing a minimum on schedule for each device to determine one or more time steps at which each device must operate. For example, a minimum on schedule for a chiller requiring the chiller to operate for 4 consecutive time steps following the time step at which the chiller begins operating may be used to determine that the chiller is required to operate at time steps t=5:8 In some embodiments, step 704 involves analyzing a minimum on schedule for each device to determine one or more specific time steps at which each device must operate as stated in the minimum on schedule. For example, a minimum on schedule for a chiller required the chiller to operate at a time step of t=4 may be used to determine that the chiller must operate at the time step t=4. In some embodiments, step 704 involves determining one or more time steps at which a particular device must be operating based on the identification that the particular device is operating at a present time step. For example, while optimizing for the next time step in the optimization horizon (e.g., t=4), a chiller may be identified as operating at the present time step (i.e., t=3) and based on a minimum on schedule requiring the chiller to operate for four consecutive time steps, it is determined that the chiller must operate for at least time steps t=3:7. In some embodiments, step 704 involves determining one or more time steps at which a particular device must be operating based on the most recent time step at which each device began operating. For example, while optimizing for the next time step in the optimization horizon (e.g., t=4), a chiller may be identified as beginning operation at a time step of t=2 and based on a minimum on schedule requiring the chiller to operate for four consecutive time steps, it is determined that the chiller must operate for at least time step t=4.

Process 700 is shown to involve generating an adjusted lower bound constraint by raising the lower bound to the minimum turndown (MTD) value for each determined device at the one or more time steps (step 706), according to some embodiments. For example, a particular chiller with an MTD value of 250 tons may be required to operate at time steps t=4:8. As a result, the lower bound of the subplant in which the particular chiller is located in is raised to the MTD value of 250 tons for time steps t=4:8. As a result of raising the lower bound of the subplant in which the particular chiller is located in, the subplant will receive a subplant load allocation determined by a high level optimization process. In some embodiments, step 706 involves raising the lower bound to the sum of the MTD values of two or more devices located in the same subplant required to operate at one or more time steps determined in step 704. For example, a chiller subplant with two chiller devices each having an MTD value of 250 tons may be required to operate at time steps t=4:8. As a result, the lower bound of the chiller subplant is raised to the summation MTD value of 500 tons for time steps t=4:8.

Process 700 is shown to involve softening the adjusted lower bound constraint (step 708), according to some embodiments. In some embodiments, raising the adjusted lower bound of one or more subplants causes an excess amount of resources to be generated than a particular consumer of the resources can handle. For example, two chiller subplants may be assigned to supply chilled water to the same chilled water load, but at a particular time step, the chilled water load may not be great enough for each of the two chiller subplants to operate at their respective MTD values. In some embodiments, softening the lower bound constraint involves associating a penalty with the softened lower bound for violating the lower bound such that the lower bound is not violated when there are no infeasibilities present. In some embodiments, a user identifies the value of the penalty to be associated with a softened lower bound constraint. In some embodiments, constraint modifier 202 is configured to associate a predetermined penalty value stored in memory 112 to the softened lower bound constraint.

Still referring to FIG. 7, process 700 is shown to involve transmitting the softened lower bound constraint to high level optimization module 130 (step 710), according to some embodiments. In some embodiments, the softened lower bound constraint transmitted to high level optimization module 130 in step 710 is used to perform a high level optimization using the softened lower bound constraint and to influence that the particular subplant in which the one or more devices associated with minimum on schedules receives a load allocation.

Using Must Run Schedules to Determine Modified Constraints

Figure 8:
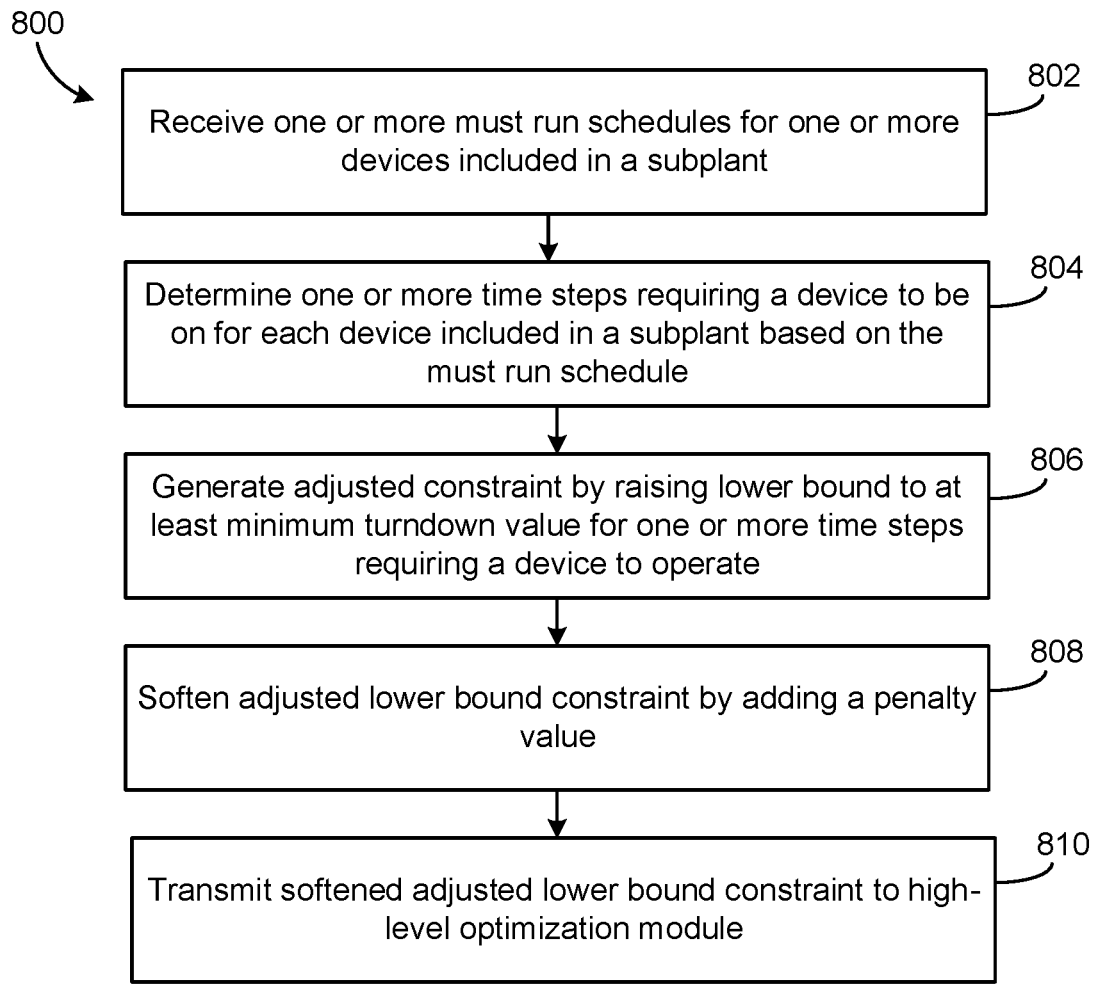
FIG. 8 is a flowchart illustrating a process of implementing a must run schedule in an optimization process, according to some embodiments.

Referring now to FIG. 8, a process 800 for implementing a must run schedule in a high level optimization process is shown, according to some embodiments. In general, a must run schedule includes one or more steps at which a particular device is required to operate, according to some embodiments. In some embodiments, a must run schedule for a particular device requires the particular device to operate at specific time steps in order avoid mechanical issues that arise if the device does not operate for an extended period of time steps. For example, a must run schedule for an absorption chiller may include specific time steps at which the absorption chiller must run in order to avoid crystallization of the solution within the chiller. In another example, a must run schedule for a boiler may include specific time steps at which the boiler must run due to emissions standards. In some embodiments, a must run schedule for a particular device includes specific time step at which the particular device must operate based on the time steps at which one or more other devices are operating. For example, a must run schedule for a first chiller may require that the first chiller must operate at least at the minimum turndown value of the first chiller at the time steps at which a second chiller must operate in order for the first chiller to be staged on in case the second chiller fails. In some embodiments, a must run schedule is used in combination with a minimum on schedule for a device to determine one or more time steps at which the device must operate.

Process 800 is shown to involve receiving one or more must run schedules for one or more devices (step 802), according to some embodiments. In some embodiments, a must run schedule is received for all devices included in a subplant. In some embodiments, each must run schedule for each device is inputted by a user and received at step 802. In some embodiments, the must run schedule for a particular device identifies one or more specific time steps at which the particular device must operate. For example, a must run schedule for a chiller may identify that the chiller must operate at the time step t=4. In some embodiments, the must run schedule for a particular device identifies one or more specific time steps at which the particular device must operate based on the must run schedule of one or more different devices. In some such embodiments, the must run schedule for the particular device identifies one or more specific time steps at which the particular device must operate based on the time steps at which one or more different devices must operate. For example, a must run schedule for a first chiller may identify that the first chiller must operate at the time steps t=4:8 based on a second chiller operating at the time steps t=4:8. In some such embodiments, the must run schedule identifies that the particular device receives a load allocation equal to or greater than its minimum turndown value.

Process 800 is shown to involve determining one or more time steps at which a particular device is required to be operating based on the received information (step 804), according to some embodiments. In some embodiments, step 804 involves analyzing a must run schedule for a device to determine one or more time steps at which the device must operate. In some embodiments, step 804 involves analyzing a must run schedule for each device to determine one or more specific time steps at which each device must operate as stated in the must run schedule. For example, a must run schedule for a chiller required the chiller to operate at a time step of t=4 may be used to determine that the chiller must operate at the time step t=4. In some embodiments, a must run schedule for a particular device that identifies the particular device must operate at the same time steps as one or more different devices is used to determine the specific time steps the particular device must operate based on the time steps that the one or more different devices must operate. For example, a must run schedule for a first chiller may identify that the first chiller must operate at the time steps t=4:8 based on a second chiller operating at the time steps t=4:8.

Process 800 is shown to involve generating an adjusted constraint by raising the lower bound of a device to at least the minimum turndown (MTD) value for the device at the one or more determined time steps (step 806), according to some embodiments. For example, a particular chiller with an MTD value of 250 tons may be required to operate at time steps t=4:8. As a result, the lower bound of the subplant in which the particular chiller is located in is raised to at least the MTD value of 250 tons for time steps t=4:8. In some embodiments, step 806 involves raising the lower bound to at least the sum of the MTD values of two or more devices located in the same subplant required to operate at one or more time steps determined in step 804. For example, a chiller subplant with two chiller devices each having an MTD value of 250 tons may be required to operate at time steps t=4:8. As a result, the lower bound of the chiller subplant is raised to at least the summation MTD value of 500 tons for time steps t=4:8.

Process 800 is shown to involve softening the adjusted lower bound constraint (step 808), according to some embodiments. In some embodiments, raising the lower bound of one or more subplants as performed in step 806 causes an excess amount of resources to be generated by the one or more subplants than a particular consumer of the resources can handle. For example, two chiller subplants may be assigned to supply chilled water to the same chilled water load, but at a particular time step, the chilled water load may not be great enough for each of the two chiller subplants to operate at least at their respective MTD values. In some embodiments, softening the lower bound constraint involves associating a large penalty with the softened lower bound for violating the lower bound such that the lower bound is not violated when there are no infeasibilities present. In some embodiments, a user identifies the value of the penalty to be associated with a softened lower bound constraint. In some embodiments, constraint modifier 202 is configured to associate a predetermined penalty value stored in memory 112 to the softened lower bound constraint.

Still referring to FIG. 8, process 800 is shown to involve transmitting the softened lower bound constraint to high level optimization module 130 (step 810), according to some embodiments. In some embodiments, the softened lower bound constraint transmitted to high level optimization module 130 in step 810 is used to perform a high level optimization using the softened lower bound constraint and to ensure that the particular subplant in which the one or more devices associated with a must run schedule receives a load allocation.

Seeding a Binary Optimization Tree Based on Minimum on/Must Run Schedules

Figure 9:
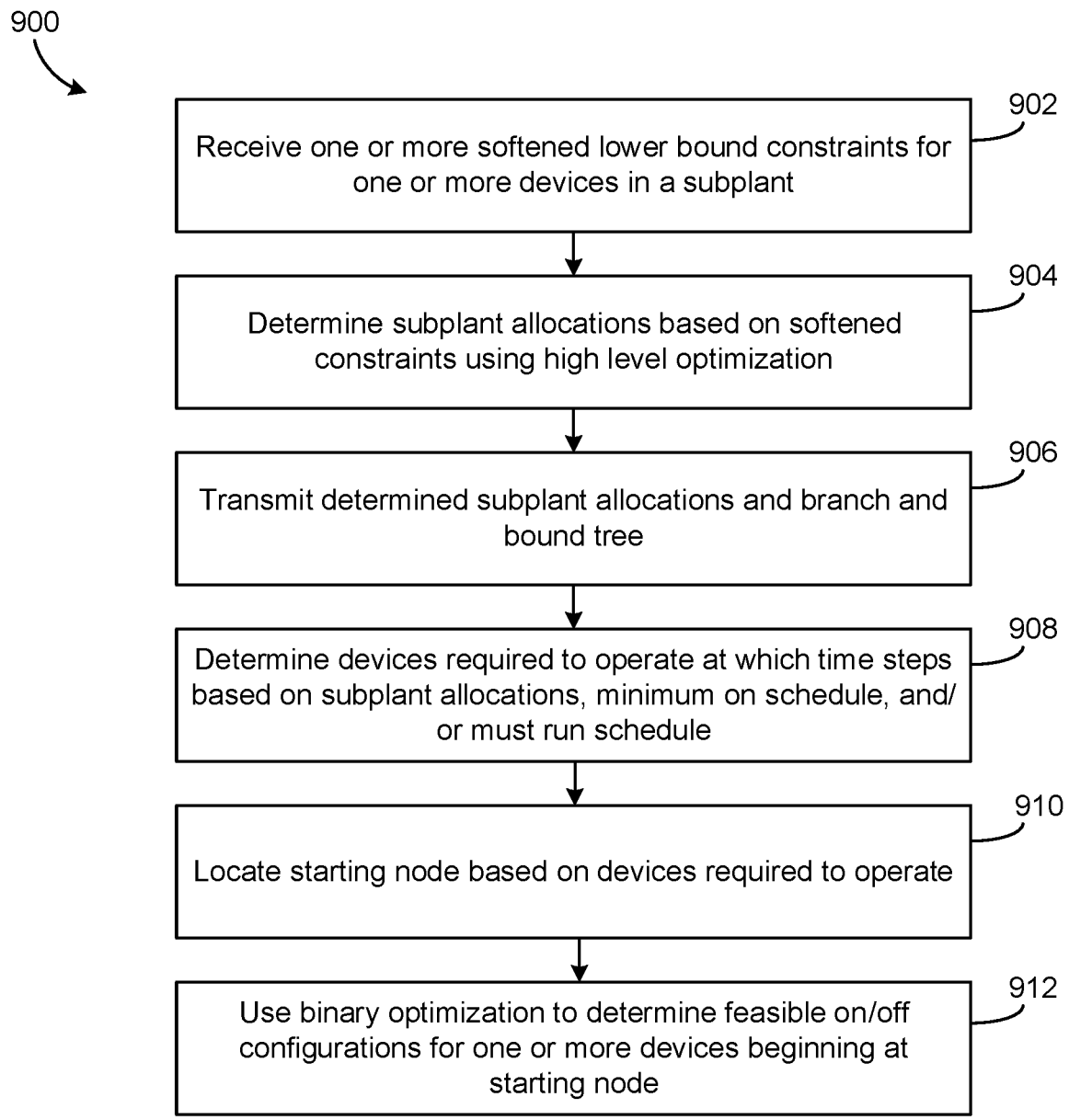
FIG. 9 is a flowchart illustrating a process of seeding a binary optimization tree to determine a starting node based on the minimum on schedule of FIG. 7 and must run schedule of FIG. 8, according to some embodiments.

Referring now to FIG. 9, a process 900 for seeding a binary optimization algorithm for a particular subplant based on one or more minimum on schedules and/or one or more must run scheduled for the one or more devices included in the particular subplant is shown, according to some embodiments. The term "seeding" as used herein is defined as a process of determining a starting node on a branch and bound tree based on equipment operational requirements (e.g., a minimum on schedule, a must run schedule, etc.). Additionally, the term "branch and bound tree" as used herein is defined as a product of a branch and bound algorithm (e.g., a binary optimization tree). In general, the process 900 for seeding a binary optimization algorithm reduces the number of iterations of a binary optimization algorithm (e.g., branch and bound) by using subplant load allocations generated by a high level optimization process to determine a starting node at which the binary optimization algorithm begins, according to some embodiments. In some embodiments, as will be described in greater detail with reference to each step of process 900, the process 900 is performed in part by seeding module 502 to determine a starting node on a branch and bound tree received from low level optimization module 132 using subplant load allocations received from high level optimization module 130.

Process 900 is shown to involve receiving one or more minimum on schedules and/or one or more must run schedules), according to some embodiments. In some embodiments, the various schedules are received by seeding module 502. In some embodiments, the minimum on schedule and/or must run schedule received at step 902 are used to identify one more devices required to operate at one or more time steps. Step 902 is also shown to involve receiving branch and bound trees generated by low level optimization module 132. In some embodiments, the branch and bound trees are received by seeding module 502.

Process 900 is shown to involve determining one or more devices required to operate based on the operational requirements of each of the one or more devices as defined by the must run schedule, minimum on schedule, etc. (step 904), according to some embodiments. In some embodiments, seeding module 502 uses the minimum on schedules and/or the must run schedule to determine one or more time steps at which one or more devices are required to operate. In some embodiments, seeding module 502 uses the branch and bound tree received in step 902 to identify one or more particular devices required to operate. In some embodiments, step 904 involves searching each time step in the optimization horizon for one or more devices required to operate at one or more time steps using the minimum on schedule and/or the must run schedule associated with the one or more devices. For example, seeding module 502 may receive subplant allocations for a chiller subplant consisting of two chiller devices and determine, based on the minimum on schedule for a first chiller device, that the first chiller device is required to operate at time steps t=4:8.

Process 900 is shown to involve locating a starting node on the branch and bound tree transmitted correlating to the one or more devices required to operate determined for each time step (step 906), according to some embodiments. In some embodiments, as will be described in greater detail with reference to FIG. 10, the seeding module 502 uses the various equipment schedules and the branch and bound tree received in step 902 to search for a starting node on the branch and bound tree. In some embodiments, the seeding module 502 uses the determined devices of step 904 to identify a starting node on the lowest level of the branch and bound tree at which low level optimization module 132 will begin a binary optimization process. At step 908, binary optimization is used to determine feasible on/off configurations for one or more devices beginning at the starting node located in step 906, according to some embodiments. In some embodiments, the binary optimization is performed by low level optimization module 132 beginning at the starting node located in step 906.

Seeded Branch and Bound Tree Example

Figure 10:
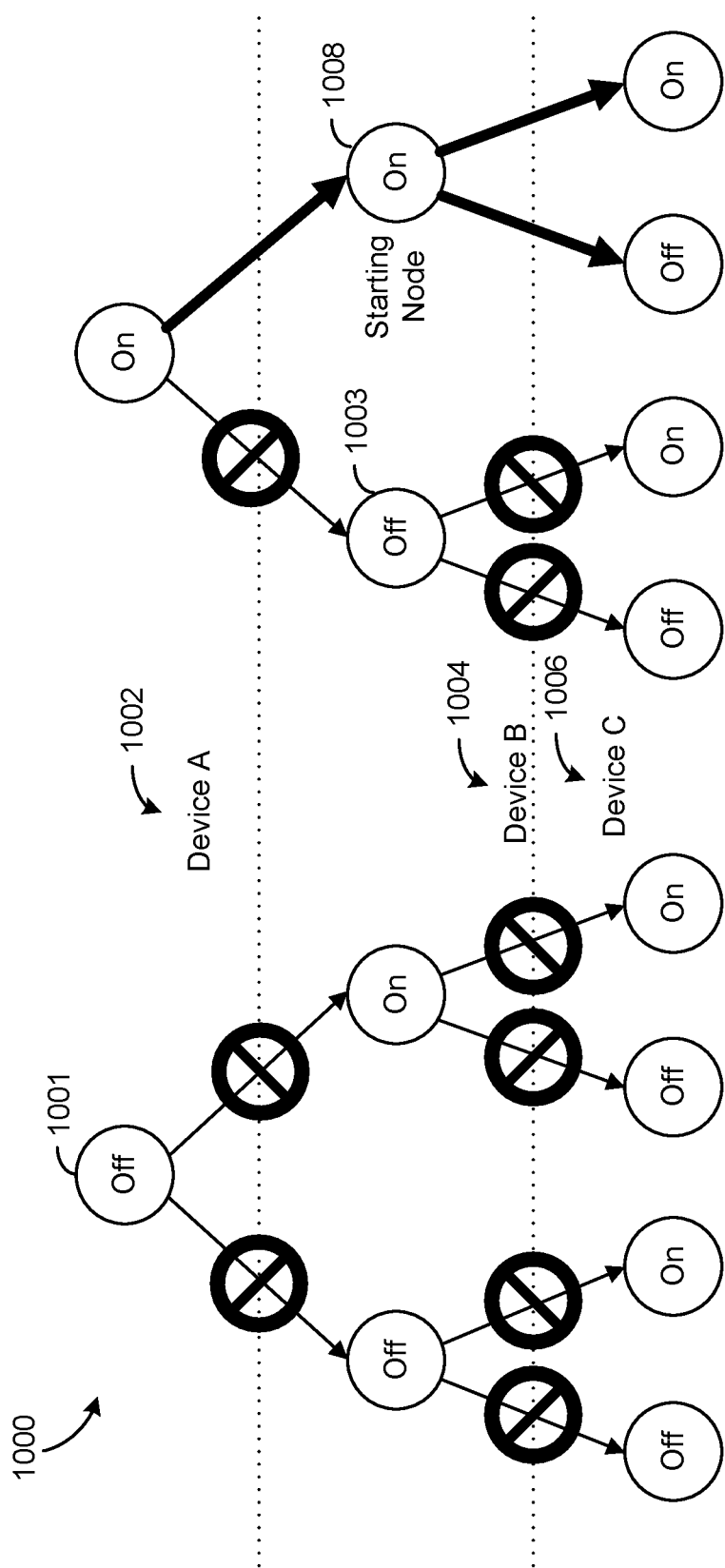
FIG. 10 is an example branch and bound tree generated using the seeding process of FIG. 9, according to some embodiments.

Referring now to FIG. 10, a seeded branch and bound tree 1000 as can be determined using process 900 is shown, according to some embodiments. In this example, a device A 1002, a device B 1004, and a device C 1006 are shown to be subject to the binary optimization algorithm. Device A 1002, device B 1004, and device C 1006 may be any devices that are included in a subplant of a central plant. In some embodiments, a subplant can include a greater number or a smaller number of devices. It should be understood that the inclusion of three devices is intended only for explanatory purposes and is not intended to be limiting.

Based on a minimum on schedule and/or must run schedule for each device A 1002, device B 1004, and device C 1006, it is determined, through process 700 and/or process 800, that device A 1002 and device B 1004 must operate for the particular time step for which the binary optimization algorithm is solving, according to some embodiments. Through performing process 900, starting node 1008 is identified in the branch and bound tree. Beginning with the device A 1002 level, the node 1001 at which device A 1002 is identified as "off" is eliminated, thereby eliminating any levels below node 1001 as possible solutions. Moving to the device B 1004 level, the branch, the node 1003 at which device B 1004 is identified as "off" is eliminated, thereby eliminating any levels below node 1003 as possible solutions. Thus, node 1008 is identified as the starting node at which the binary optimization algorithm will begin the remaining layer searches. Advantageously, by performing processes 700 and 800 and producing the seeded branch and bound tree 1000 using process 900, the number of required binary optimization iterations is reduced from 7 iterations to 2 iterations.

Using Minimum Off Schedules to Determine Modified Constraints

Figure 11:
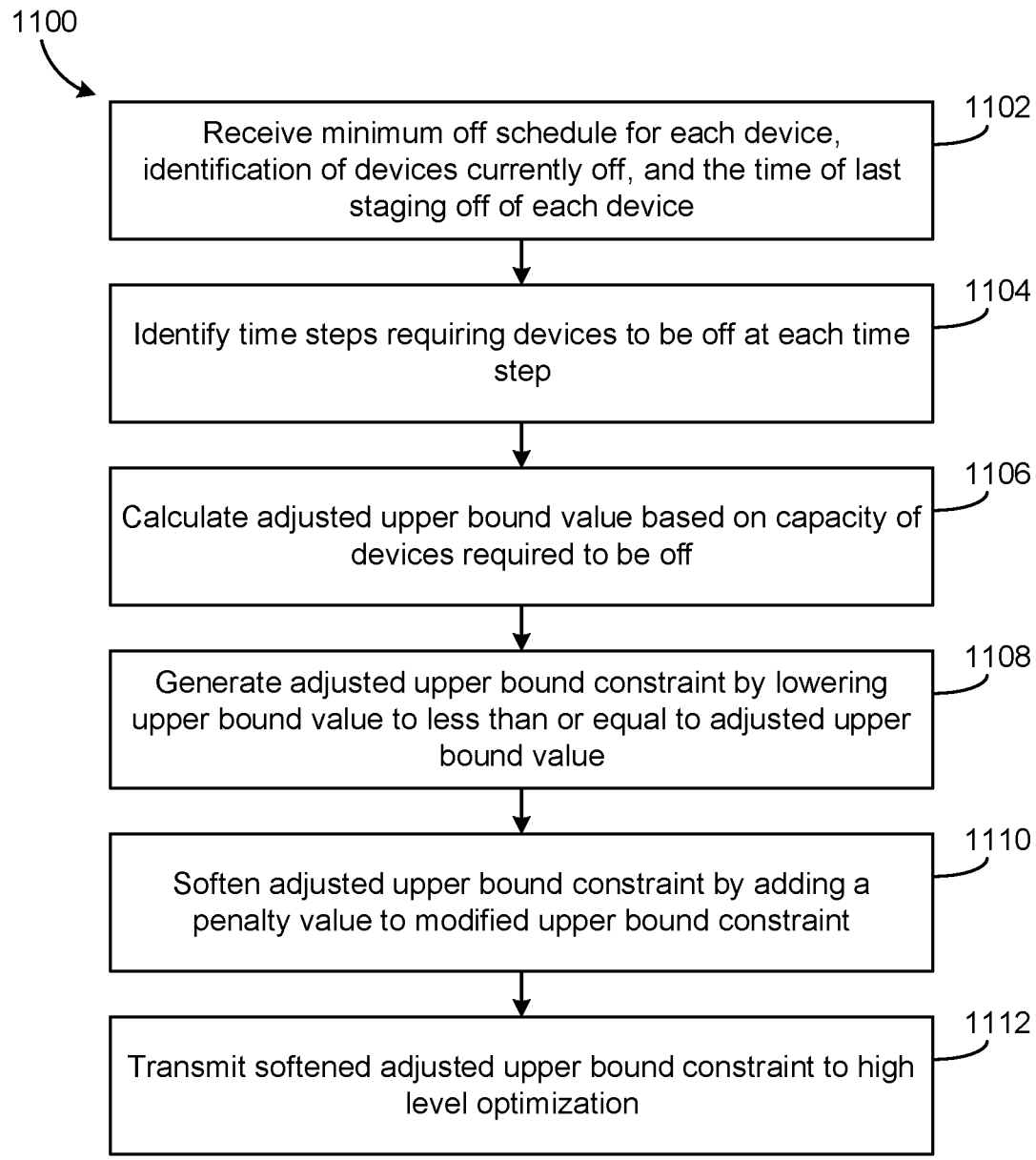
FIG. 11 is a flow chart illustrating a process of generating and implementing a minimum off schedule in an optimization process, according to some embodiments.

Referring now to FIG. 11, a process 1100 for using a minimum off schedule to determine modified constraints is shown, according to some embodiments. In some embodiments, the process 1100 is performed by constraint modifier 502 to determine one or more devices in a particular subplant required to be off at one or more time steps. In some embodiments, as will be described in greater detail with reference to FIG. 14, a minimum off schedule associated with a particular device contains a recycle-on timer allowing for the particular device to turn off within a specified time period from the last time step at which the particular device switched from an on state to an off state.

Process 1100 is shown to involve receiving a minimum off schedule for each device, identification of devices that are off at a present time step, and the last time step at which each device was turned off (step 1102), according to some embodiments. In some embodiments, the minimum off schedule for each device identifies a required number of consecutive time steps at which each device must be off. For example, a minimum off schedule for a chiller may identify that the chiller must be off for consecutive time steps following the time step at which the chiller stopped operating. In some embodiments, the minimum off schedule identifies specific time steps at which each device must be off. For example, a minimum off schedule for a chiller may identify that the chiller must be off at the time step t=4. In some embodiments, the minimum off schedule for each device identifies a combination of the non-operating required previously listed. For example, a minimum off schedule for a chiller may identify that the chiller must be off at the time step t=4 and must remain off for four consecutive time steps (i.e., the chiller is off for time steps t=4:9). In some embodiments, step 1102 involves receiving an identification which devices are off at a present time step. For example, while optimizing for the next time step in the optimization horizon (e.g., t=4), a chiller may be identified as non-operating at the present time step (i.e., t=3). In some embodiments, step 1102 involves receiving the most recent time step at which each device was turned off. For example, while optimizing for the next time step in the optimization horizon (e.g., t=4), a chiller may be identified as ceasing operation at a time step of t=2.

Process 1100 is shown to involve determining one or more time steps at which a particular device is required to be off based on the received information (step 1104), according to some embodiments. In some embodiments, step 1104 involves analyzing a minimum off schedule for each device to determine one or more time steps at which each device must be off. For example, a minimum off schedule for a chiller requiring the chiller to be off for 4 consecutive time steps following the time step at which the chiller ceases operation may be used to determine that the chiller is required to be off at time steps t=5:8 if the chiller was turned off at a time step of t=4. In some embodiments, step 1104 involves analyzing a minimum off schedule for each device to determine one or more specific time steps at which each device must be off as stated in the minimum off schedule. For example, a minimum off schedule for a chiller requiring the chiller to be off at a time step of t=4 may be used to determine that the chiller must be off at the time step t=4. In some embodiments, step 1104 involves determining one or more time steps at which a particular device must be off based on the identification that the particular device is not operating at a particular time step. For example, while optimizing for the next time step in the optimization horizon (e.g., t=4), a chiller may be identified as off at the present time step (i.e., t=3) and based on a minimum off schedule requiring the chiller to be off for four consecutive time steps, it is determined that the chiller must be off for at least time steps t=3:7. In some embodiments, step 1104 involves determining one or more time steps at which a particular device must be off based on the most recent time step at which each device ceased operating. For example, while optimizing for the next time step in the optimization horizon (e.g., t=4), a chiller may be identified as ceasing operation at a time step of t=2 and based on a minimum off schedule requiring the chiller to be off for four consecutive time steps, it is determined that the chiller must be off for at least time step t=4.

Process 1100 is shown to involve calculating an adjusted upper bound value based on the maximum capacity of one or more devices required to be off (step 1106), according to some embodiments. The adjusted upper bound can be represented with the following equation:

$$C_{adj} = C_T - \sum_{m}^{M} C_m$$

where $C_{adj}$ is the adjusted upper bound, $C_T$ is the total capacity of all devices included in the particular subplant, and $C_m$ is the capacity of the device m requiring to be off where m=1: M and M is the total number of devices required to be off. Step 1108 is shown to involve generating a modifier upper bound constraint by lowering the upper bound value of a particular subplant to a value equal to or less than the adjusted upper bound value calculated in step 1108, according to some embodiments. For example, a particular chiller device is determined to be off at time steps t=4:8. As a result, a modified upper bound constraint is generated for the subplant in which the particular chiller device is located in and applied at time steps t=4:8.

Still referring to FIG. 11, process 1100 is shown to involve softening the adjusted upper bound constraint (step 1110) to account for operational infeasibilities, according to some embodiments. For example, a chiller subplant with two chiller devices may be supplying resources for the same resource consumer, and, based on the minimum off schedule for the first chiller device, the first chiller device turns off at a present time. As a result, the upper bound constraint is lowered (e.g., modified as performed by step 1106) for the chiller subplant due to the requirements of the minimum off schedule for the first chiller device. The second chiller device must now produce the entirety of the resource amount as defined by the lowered upper bound constraint. However, if at the next time step, the subplant load allocation rises above the upper bound constraint, an infeasibility will occur due to the second chiller device (i.e., the only chiller device operating in the chiller subplant at the next time step) not being capable of producing an amount of a resource greater than the amount defined by the upper bound constraint.

In some embodiments, softening the modified upper bound constraint involves associating a penalty with the softened modified upper bound constraint for violating the modified upper bound constraint such that the modified upper bound constraint is not violated when there are no infeasibilities present. In some embodiments, a user identifies the value of the penalty to be associated with the softened modified upper bound constraint. In some embodiments, constraint modifier 502 is configured to apply a predetermined penalty value stored in memory 112 to the softened modified upper bound constraint.

Process 1100 is shown to involve transmitting the softened modified upper bound constraint to high level optimization module 130 (step 1112), according to some embodiments. In some embodiments, the softened modified upper bound constraint transmitted to high level optimization module 130 in step 1112 is used to perform a high level optimization process using the softened modified upper bound constraint to determine subplant load allocations.

Pruning a Branch and Bound Tree Based on Minimum Off Schedules

Figure 12:
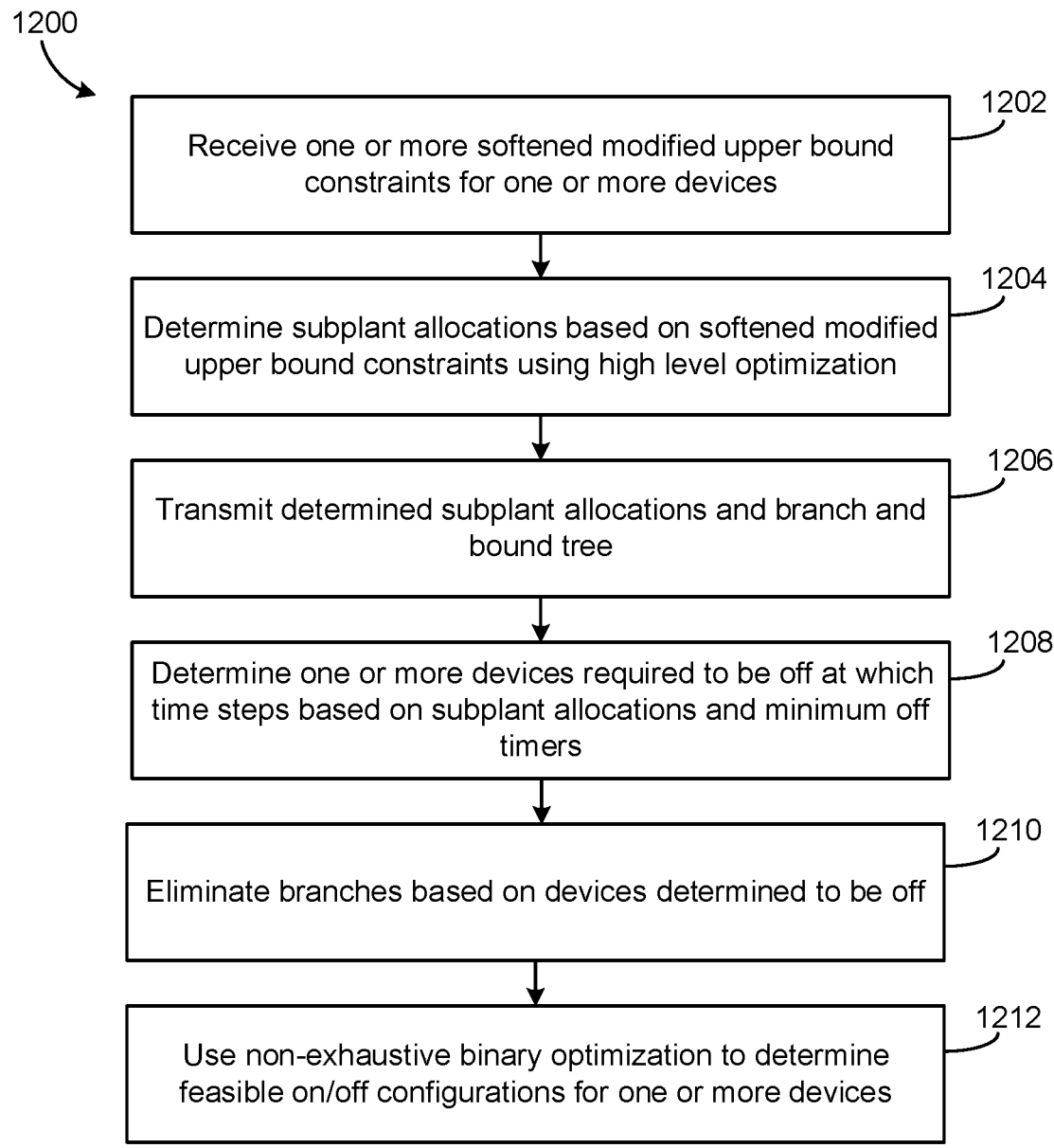
FIG. 12 is a flowchart illustrating a process of pruning a binary optimization tree to eliminate infeasible solutions based on the minimum off schedule of FIG. 11, according to some embodiments.

Referring now to FIG. 12, a process 1200 for pruning a binary optimization tree as determined using a binary optimization algorithm for a particular subplant based on one or more minimum off schedules for the one or more devices included in the particular subplant is shown, according to some embodiments. The term "pruning" as used herein is defined as a process to eliminate branches of a branch and bound tree associated with infeasible solutions. In general, the process 1200 for pruning a binary optimization algorithm reduces the number of iterations of a binary optimization algorithm (e.g., branch and bound) by using one or more minimum off schedules of one or more devices to determine one or more infeasible combinations of devices.

As a result of determining one or more infeasible combinations of devices, branches of the branch and bound algorithm can be eliminated and reduce the number of iterations required to solve for an optimal combination of devices. In some embodiments, as will be described in greater detail with reference to each step of process 1200, the process 1200 is performed by pruning module 504 using one or more minimum off schedules for one or more devices and a branch and bound tree received from low level optimization module 132.

Process 1200 is shown to involve receiving one or more minimum off schedules (step 1202), according to some embodiments. In some embodiments, the one or more minimum off schedules received at step 1202 are used to identify one or more devices required to be off at one or more time steps. Step 1202 is also shown to involve receiving branch and bound trees generated by low level optimization module 132. In some embodiments, the branch and bound trees are received by pruning module 504.

Process 1200 is shown to involve determining one or more devices required to be off based on the minimum off timers (step 1204), according to some embodiments. In some embodiments, pruning module 504 uses the minimum off schedules to determine one or more time steps at which one or more devices are required be off. In some embodiments, pruning module 504 uses the branch and bound tree transmitted in step 1204 to identify one or more particular devices required to be off. In some embodiments, step 1204 involves searching each time step in the optimization horizon for one or more devices required to be off at one or more time steps using the minimum off schedule associated with the one or more devices. For example, pruning module 504 may determine, for a chiller subplant consisting of two chiller devices and based on the minimum off schedule for a first chiller device, that the first chiller device is required to be off at time steps t=4:8.

Process 1200 is shown to involve eliminating one or more branches on the branch and bound tree correlating to the one or more devices required to be off (step 1206), according to some embodiments. In some embodiments, as will be described in greater detail with reference to FIG. 13, the pruning module 504 uses the minimum off schedules and the branch and bound tree received in step 1202 to eliminate branches associated with infeasible solutions (as determined by the minimum off schedules) on the branch and bound tree. In some embodiments, the pruning module 504 uses the determined devices of step 1204 to identify nodes at which the determined devices are shown as operating. In some such embodiments, the pruning module 504 eliminates any branches on the branch and bound tree located beyond the nodes at which the determined devices are shown as operating. At step 1208, a binary optimization process is performed to determine feasible on/off configurations for one or more devices, according to some embodiments.

Pruned Branch and Bound Example

Figure 13:
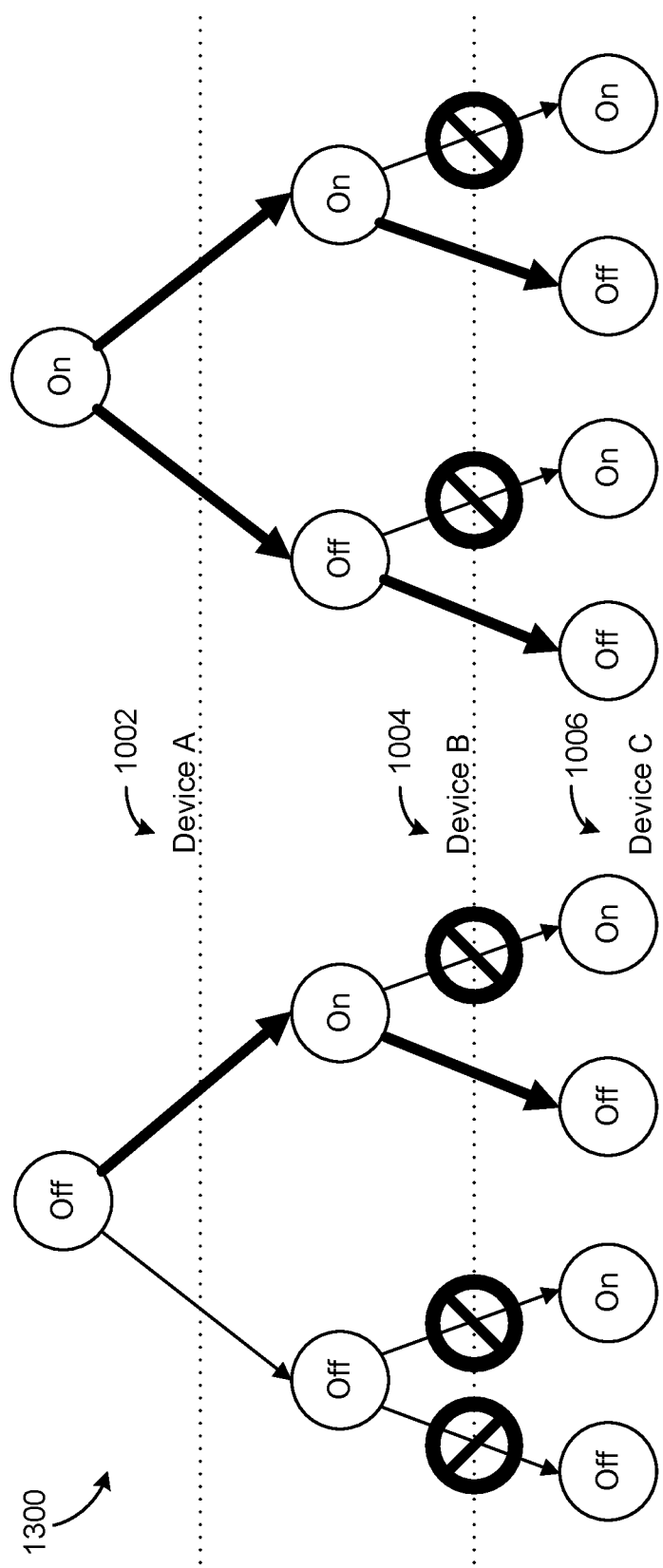
FIG. 13 is an example branch and bound tree generated using the pruning process of FIG. 12, according to some embodiments.

Referring now to FIG. 13, a pruned branch and bound tree 1300 as can be determined using process 1200 is shown, according to some embodiments. In this example, device A 1002, device B 1004, and device C 1006 are shown to be subject to the binary optimization algorithm. Device A 1002, device B 1004, and device C 1006 may be any device that are included in a subplant of a central plant. In some embodiments, a subplant can include a greater number or smaller number of devices. It should be understood that the inclusion of three devices is intended only for explanatory purposes and is not intended to be limiting.

Based on a minimum off schedule for each device A 1002, device B 1004, and device C 1006, it is determined, through process 1100, that device C 1006 as a device required to be off for the particular time step for which the binary optimization algorithm is solving, according to some embodiments. Through performing process 1200, any branch which includes device C 1006 as operating is eliminated. Advantageously, by performing process 1100 and producing the pruned branch and bound tree 1300 using process 1200, the number of required binary optimization iterations is reduced from 7 iterations to 3 iterations.

Detecting Conflict in Constraints

Referring now to FIG. 14, a process 1400 for determining one or more time steps at which constraints (e.g., softened lower bound constraints based on minimum on schedule, etc.) between two or more devices conflict and solving for the conflict, according to some embodiments. The process 1400 can be performed by constraint modifier 202, according to some embodiments. At step 1402, the operating state (e.g., on, off) of one or more devices included in a particular subplant at a present time step is determined, according to some embodiments. In some embodiments, step 1402 involves analyzing the load allocation for one or more devices as generated by a low level optimization process to determine the operating state of one or more devices. For example, a first chiller device in a particular chiller subplant may receive a load allocation of 250 tons at a time step of t=4. As a result, the first chiller device in the particular subplant would be determined as operating at the time step of t=4. In another example, a second chiller device in the particular chiller subplant may not receive a load allocation at the time step of t=4. As a result, the second chiller device in the particular subplant would be determined as not operating at the time step of t=4. In some embodiments, step 1402 involves analyzing the minimum on schedule, must run schedule, and/or the minimum off schedule for one or more devices to determine the operating state of one or more devices at a present time step.

Process 1400 is shown to involve analyzing the upcoming operational schedules for one or more devices included in a particular subplant (step 1404), according to some embodiments. In some embodiments, step 1404 involves analyzing the load allocation for one or more devices as generated by a low level optimization for one or more future time steps, according to some embodiments. For example, a first chiller device in a particular chiller subplant may receive a load allocation of 250 tons at a future time step of t=9. As a result, the first chiller device in the particular subplant would be determined as operating at the time step of t=9. In another example, a second chiller device in the particular subplant may not receive a load allocation at the future time step of t=9. As a result, the second chiller device in the particular subplant would be determined as not operating at the time step of t=9. In some embodiments, step 1404 involves analyzing the minimum on schedule, must run schedule, and/or the minimum off schedule for one or more devices to determine the operating state of one or more devices at one or more future time steps.

In some embodiments, step 1404 involves determining if one or more recycle on timers and/or recycle off timers exist for one or more devices. In some embodiments, a minimum on schedule associated with a device includes a recycle off timer allowing for the time steps at which a device is to be "off" to be moved to alternate time steps. In some such embodiments, the recycle off timer signals that the device to which the recycle off timer is assigned is allowed to begin operation within a certain amount of time steps from the most recent time step at which the device began operating. In some embodiments, a minimum off schedule associated with a device includes a recycle on timer allowing for the time steps at which a device is to be "on" to be moved to alternate time steps. In some such embodiments, the recycle on timer signals that the device to which the recycle on timer is assigned is allowed to cease operation within a certain amount of time steps from the most recent time step at which the device stopped operating. If a recycle on timer and/or a recycle off timer is associated with the minimum on schedule and/or minimum off schedule of a device, then time steps defined by the recycle on timer and/or the recycle off timer can be used to compensate for conflicting constraints, according to some embodiments.

Process 1400 is shown to determine if a conflict between operational requirements of one or more devices will exist in one or more future time steps based on the current operating state determined of the one or more devices and the future operating states of the one or more devices (step 1406), according to some embodiments. As will be described in the example cases below, each time step in an optimization horizon is examined by constraint modifier 202 to determine if two or more constraints overlap. In some embodiments, a conflict between constraints is determined when two or more constraints overlap and multiple penalties are applied at one or more time steps in the optimization horizon. Step 1408 is shown to involve adjusting the operational schedule to address one or more conflicts determined in step 1406, according to some embodiments. In some embodiments, step 1408 involves using the recycle off timer associated with a minimum off schedule to compensate for a conflict in constraints. In some embodiments, step 1408 involves using the recycle on timer associated with a minimum on schedule to compensate for a conflict in constraints.

Example Case 1

At step 1402, it is determined that a particular device is currently off at a time step of t=1 (e.g., the particular device is not receiving a load allocation, the particular device is not producing a resource, etc.). At step 1404, it is determined that an out of service schedule is planned for time steps t=4:6 and a minimum on schedule requires the particular device to operate for 3 consecutive time steps. If the device was turned on at the present time step of t=1, due to the requirements of the minimum on schedule, step 1406 determines that a conflict would exist at a time step of t=4 (i.e., the time step at which the out of service schedule begins). As a result, the out of service schedule is moved to begin at the present time step of t=1 (i.e., out of service schedule is planned for t=1:3) with the minimum on schedule following the end of the out of service schedule (i.e., minimum on schedule planned for t=4:6).

Example Case 2

At step 1402, it is determined that a particular device is current on a time step of t=1 (e.g., the particular is receiving a load allocation, the particular device is producing a resource, etc.). At step 1404, it is determined that a must run schedule is planned for time steps t=4:6 and a minimum off schedule requires the particular device to be off for time steps t=2:5. If the device follows the operation schedule as previously described, step 1406 determines that a conflict would exist at time steps t=4:5 (i.e., the time steps at which the must run schedule and minimum off schedule overlap). As a result, the must run schedule is advance to begin at time step t=1 and run through time step t=3 with the minimum off schedule turning the particular device off for time steps t=4:7. By accounting for the conflict in constraints, cycling of the particular device between devices is avoided.

Decaying Constraints

Referring now to FIG. 15, a process 1500 for decaying penalties associated with soft constraints is shown, according to some embodiments. In some embodiments, the process 1500 is applied to the soft constraints generated as a result of the minimum on schedule illustrated in process 700, must run schedule illustrated in process 800, and/or minimum off schedule illustrated in process 1100. In general, the process 1500 for decaying penalties is used to gradually decrease, throughout the optimization horizon, the weight of a penalty of violating the soft constraint each penalty is associated with. Process 1500 is shown to involve receiving one or more soft constraints as determined by the minimum on schedule, must run schedule and/or the minimum off schedule (step 1502), according to some embodiments. As previously described, during the generation of the associated soft constraints, a penalty is incorporated with each respective soft constraint.

Process 1500 is shown to involve calculating a new effective penalty for one or more future time steps (1504), according to some embodiments. The new effective penalty can be calculated for each future time step and for each type of soft constraint. The new effective penalty can be represented with the equation below:

$$P_{\text{eff}} = P_0(1 - t_n\alpha) + \alpha x, \text{ where } x = \begin{cases} 1, \text{ constraint active at } t_0 \\ 0, \text{ constraint inactive at } t_0 \end{cases}$$

where $P_{\text{eff}}$ is the effective penalty value at time step $t_n$, $P_0$ is the base penalty value, $\alpha$ is a scaling percentage, and x is defined within the function. In some embodiments, the base penalty value $P_0$ is the initial penalty value associated with the particular soft constraint. In some embodiments, the value of scaling percentage a is transmitted to constraint modifier 202 from a user. In some embodiments, constraint modifier 202 retrieves the scaling percentage a from memory 112. Process 1500 is shown to involve using the new effective penalty value in one or more future time steps (step 1506), according to some embodiments.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for a central plant comprising a plurality of subplants, wherein each of the plurality of subplants comprises one or more devices that operate to serve one or more energy loads of a building, the control system comprising:
  a high level optimization module configured to perform a high level optimization of a plurality of thermal loads subject to a plurality of constraints to generate a plurality of subplant load allocations in an optimization period;
  a low level optimization module configured to perform a low level optimization of the plurality of subplant load allocations to determine in the optimization period a plurality of operating states for each of the one or more devices included in each of the plurality of subplants included in the central plant;
  a constraint modifier configured to lower an upper bound or raise a lower bound of the plurality of constraints for use by the high level optimization module based on a plurality of minimum off schedules and a plurality of minimum on schedules associated with the one or more devices; and
  a binary optimization modifier configured to generate a plurality of simplified solutions for use by the low level optimization module, wherein the binary optimization modifier comprises:

a pruning module configured to receive the plurality of minimum off schedules and determine, using the plurality of minimum off schedules, a plurality of adjusted branches for use in a binary optimization process by the low level optimization module; and a seeding module configured to receive the plurality of minimum on schedules to determine, using the plurality of minimum on schedules, a starting node for use in the binary optimization process by the low level optimization module.

2. The control system of claim 1, wherein the constraint modifier is configured to modify the plurality of constraints based on a plurality of must run schedules, wherein each of the plurality of must run schedules is associated with one of the one or more devices.

3. The control system of claim 1, wherein the low level optimization module is further configured to perform the binary optimization process, wherein the binary optimization process is configured to select one or more of the one or more devices to operate for each time step in the optimization period.

4. The control system of claim 1, wherein the constraint modifier is configured to generate a decayed penalty value for at least one of the plurality of constraints, wherein the generated decayed penalty value defines at least one of a prioritization scheme for satisfying a plurality of operational constraints and a decaying penalty for violating the plurality of operational constraints throughout an optimization period.

5. The control system of claim 1, wherein the constraint modifier is configured to generate the upper bound based on the plurality of minimum off schedules, wherein the upper bound is used by the high level optimization module in a high level optimization process.

6. The control system of claim 1, wherein the constraint modifier is configured to raise a value of the lower bound to a minimum turndown value for a particular device based on one of the plurality of minimum on schedules associated with the particular device.

7. The control system of claim 1, wherein the binary optimization modifier further comprises a hysteresis modifier configured to receive an identification of a combination of dispatched devices for a previous time step from the low level optimization module, wherein the hysteresis modifier is configured to calculate an adjusted heat transfer rate value for the combination of dispatched devices for the previous time step.

8. The control system of claim 7, wherein the low level optimization module is configured to receive the adjusted heat transfer rate value from the hysteresis modifier and calculate an energy consumption value associated with the adjusted heat transfer rate value.

9. A method of controlling a central plant having a plurality of subplants, wherein each of the plurality of subplants comprises one or more devices operating to serve one or more energy loads of a building, the method comprising:

receiving a plurality of minimum off schedules and a plurality of minimum on schedules associated with each of the one or more devices;

using the plurality of minimum off schedules to determine one or more modified upper bound constraints and the plurality of minimum on schedules to determine one or more modified lower bound constraints, wherein a plurality of adjusted constraints comprise the one or more modified upper bound constraints and the one or more modified lower bound constraints;

performing a high level optimization of the plurality of subplants subject to one or more of the plurality of adjusted constraints to generate a plurality of subplant load allocations;

using the plurality of minimum off schedules to determine a plurality of adjusted branches for use in a binary optimization process;

using the plurality of minimum on schedules to determine a starting node for use in the binary optimization process;

performing the binary optimization process using the plurality of adjusted branches and the starting node to determine a plurality of operating states, wherein each of the plurality of operating states are associated with the one or more devices included in the plurality of subplants; and using the plurality of operating states and the plurality of subplant load allocations to determine a plurality of control actions for the one or more devices included in the plurality of subplants.

10. The method of claim 9, wherein performing the binary optimization process comprises performing a branch and bound process.

11. The method of claim 9, further comprising:

receiving an identification of a combination of dispatched devices for a previous time step; and calculating an adjusted heat transfer rate value for the combination of dispatched devices for the previous time step.

12. The method of claim 11, wherein the method further involves using the adjusted heat transfer rate value to calculate an energy consumption value associated with the adjusted heat transfer rate value.

13. The method of claim 9, wherein using the plurality of minimum on schedules to determine the one or more modified lower bound constraints further comprises increasing the value of one or more modified lower bound constraints to at least one or more minimum turndown values for the one or more devices associated with the plurality of minimum on schedules.

14. The method of claim 9, wherein the method further involves generating a decayed penalty value for each of the plurality of adjusted constraints, wherein the generated decayed penalty value defines at least one of a prioritization scheme for satisfying a plurality of operational constraints and a decaying penalty for violating the plurality of operational constraints throughout an optimization period.

15. A control system for a central plant comprising a plurality of subplants, wherein each of the plurality of subplants comprises one or more devices that operate to serve one or more energy loads of a building, the control system comprising:

a high level optimization module configured to perform a high level optimization of a plurality of thermal loads subject to a plurality of constraints to generate a plurality of subplant load allocations in an optimization period;

a low level optimization module configured to perform a low level optimization of the plurality of subplant load allocations to determine in the optimization period a plurality of operating states for each of the one or more devices included in each of the plurality of subplants included in the central plant;

a constraint modifier configured to modify the plurality of constraints for use by the high level optimization module by calculating an adjusted upper bound value or an adjusted lower bound value for the plurality of constraints based on a plurality of minimum off schedules and a plurality of minimum on schedules associated with the one or more devices; and a binary optimization modifier configured to generate a plurality of simplified solutions for use by the low level optimization module, wherein the binary optimization modifier comprises:

a hysteresis modifier configured to receive an identification of a combination of dispatched devices for a previous time step from the low level optimization module, wherein the hysteresis modifier is configured to calculate an adjusted heat transfer rate value for the combination of dispatched devices for the previous time step.

16. The control system of claim 15, wherein the low level optimization module is configured to receive the adjusted heat transfer rate value from the hysteresis modifier and calculate an energy consumption value associated with the adjusted heat transfer rate value.

17. The control system of claim 15, wherein the binary optimization modifier further comprises a pruning module configured to receive the plurality of minimum off schedules and determine, using the plurality of minimum off schedules, a plurality of adjusted branches for use in a binary optimization process by the low level optimization module.

18. The control system of claim 15, wherein the constraint modifier is configured to generate the adjusted upper bound value based on the plurality of minimum off schedules, wherein the adjusted upper bound value is used by the high level optimization module in a high level optimization process.

19. The control system of claim 15, wherein the binary optimization modifier further comprises a seeding module configured to receive the plurality of minimum on schedules and determine, using the plurality of minimum on schedules, a starting node for use in a binary optimization process by the low level optimization module.

20. The control system of claim 15, wherein the constraint modifier is configured to raise the value of a lower bound constraint to a minimum turndown value for a particular device based on one of the plurality of minimum on schedules associated with the particular device.

* * * * *